US012434416B2

(12) United States Patent
Steurer et al.

(10) Patent No.: US 12,434,416 B2
(45) Date of Patent: Oct. 7, 2025

(54) PLASTIC INJECTION TOOL FOR PRODUCING A CLOSURE CAP, AND METHOD FOR PRODUCING A CLOSURE CAP

(71) Applicant: z-werkzeugbau-gmbh, Dornbirn (AT)

(72) Inventors: Johannes Steurer, Langenegg (AT); Franz Helth, Hohenems (AT); Erik Schneider, Koblach (AT)

(73) Assignee: z-werkzeugbau-gmbh, Dornbirn (AT)

( * ) Notice: Subject to any disclaimer, the term of this patent is extended or adjusted under 35 U.S.C. 154(b) by 125 days.

(21) Appl. No.: 18/017,454

(22) PCT Filed: Jul. 26, 2021

(86) PCT No.: PCT/EP2021/070813
§ 371 (c)(1),
(2) Date: Jan. 23, 2023

(87) PCT Pub. No.: WO2022/018296
PCT Pub. Date: Jan. 27, 2022

(65) Prior Publication Data
US 2023/0271363 A1 Aug. 31, 2023

(30) Foreign Application Priority Data

Jul. 24, 2020 (DE) .................... 10 2020 119 585.0

(51) Int. Cl.
B29C 45/44 (2006.01)
B29C 45/00 (2006.01)
(Continued)

(52) U.S. Cl.
CPC ...... B29C 45/4435 (2013.01); B29C 45/0081 (2013.01); B29C 45/26 (2013.01);
(Continued)

(58) Field of Classification Search
CPC ............ B29C 45/4435; B29C 45/0081; B29C 45/2628; B29C 2045/334; B29L 2031/565; B29L 2031/56
See application file for complete search history.

(56) References Cited

U.S. PATENT DOCUMENTS 7,901,202 B2    3/2011  Bereuter et al.
2001/0015341 A1 8/2001  Higgins
(Continued)

FOREIGN PATENT DOCUMENTS

DE   10 2018 126 537 A1   4/2020
EP         1 905 566 B1   11/2009
EP         2 052 834 B1   8/2011

OTHER PUBLICATIONS

International Search Report of PCT/EP2021/070813, mailed Sep. 15, 2021.

Primary Examiner — John J DeRusso
(74) Attorney, Agent, or Firm — Collard & Roe, P.C.

(57) ABSTRACT

A plastic injection tool for producing a closure cap is divided into first and second mold halves that can be moved relative to one another and an injection nozzle is formed in the first mold half, and sliding jaw tool parts are formed in the second mold half, radially outside a central tool core, which can simultaneously be moved in an ejection direction of the produced closure cap and perpendicular to the ejection direction. A respective partial ejection contour of the cap body is formed in the sliding jaw tool parts. An ejector is also provided for ejecting the produced closure cap. Partial injection contours that are different from one another are formed in sliding jaw tool parts, and a sliding jaw tool part is in contact with the tool core in two regions lying after one another in the ejection direction, before the ejection of the closure cap.

14 Claims, 18 Drawing Sheets

(51) Int. Cl.
 B29C 45/26 (2006.01)
 B29C 45/33 (2006.01)
 B29L 31/56 (2006.01)
(52) U.S. Cl.
 CPC .... B29C 45/2628 (2013.01); *B29C 2045/334* (2013.01); *B29L 2031/565* (2013.01)

(56) References Cited

U.S. PATENT DOCUMENTS

| | | | |
|---|---|---|---|
| 2009/0104306 A1* | 4/2009 | Bereuter | B29C 45/4435 425/556 |
| 2022/0297896 A1* | 9/2022 | Zuffa | B29C 43/361 |
| 2024/0025095 A1* | 1/2024 | Scherer | B29C 45/0081 |

* cited by examiner

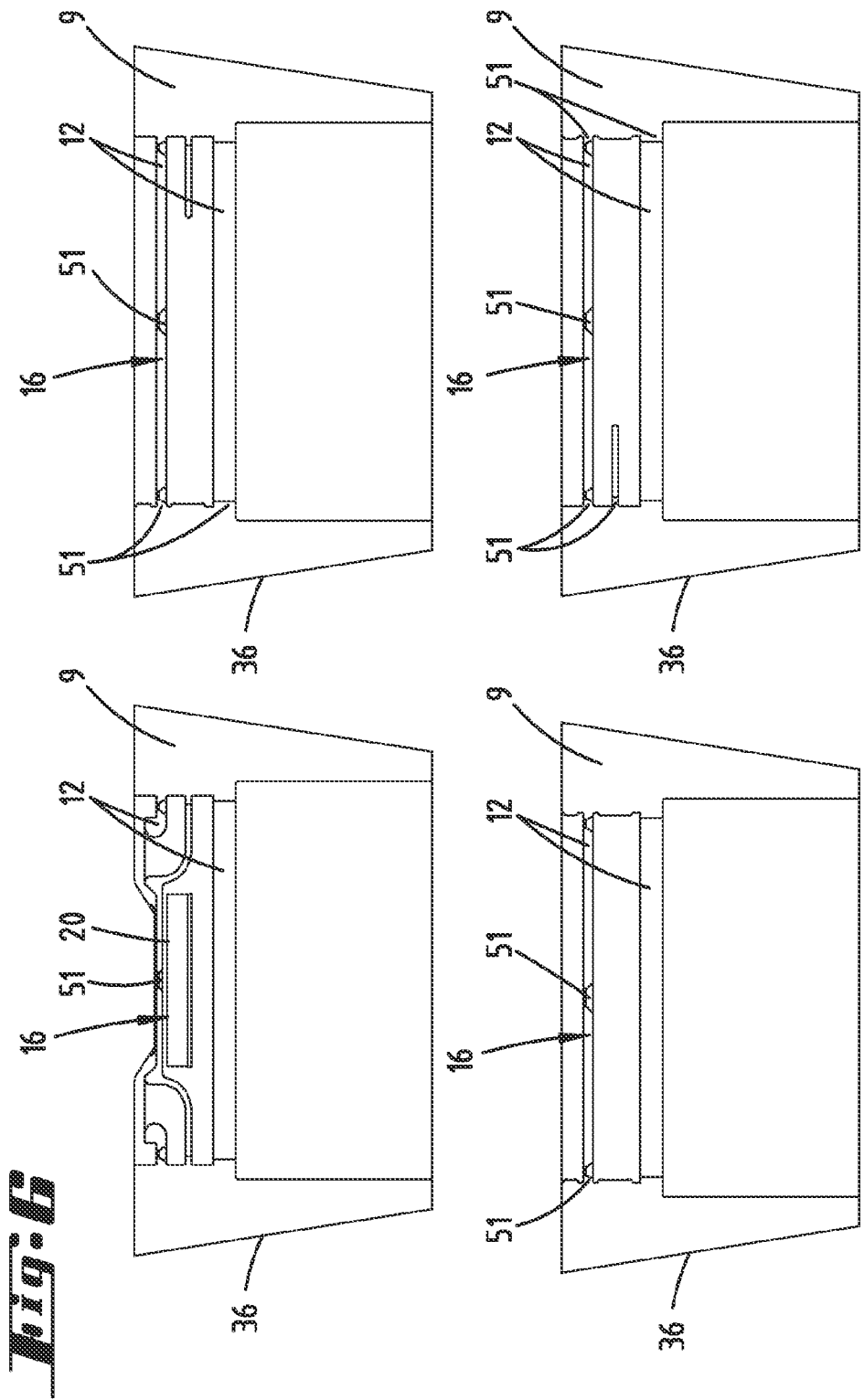

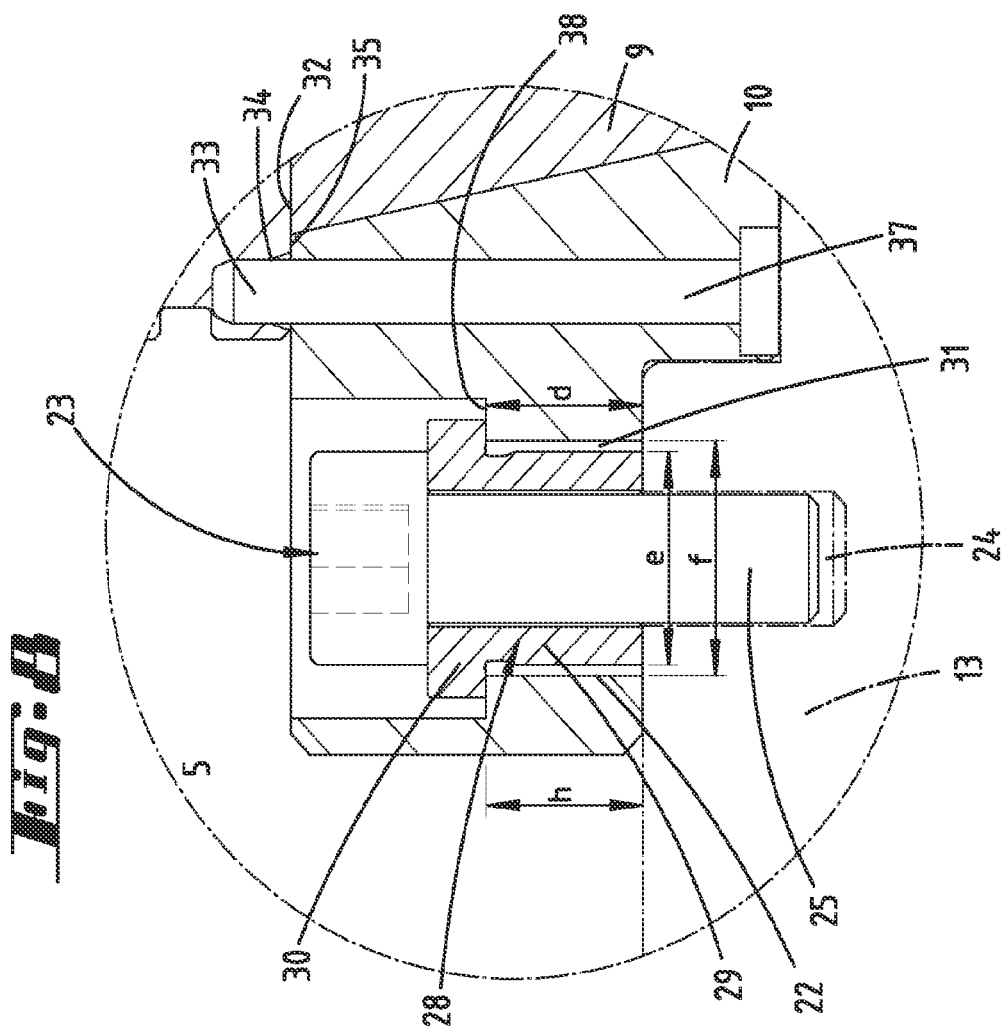
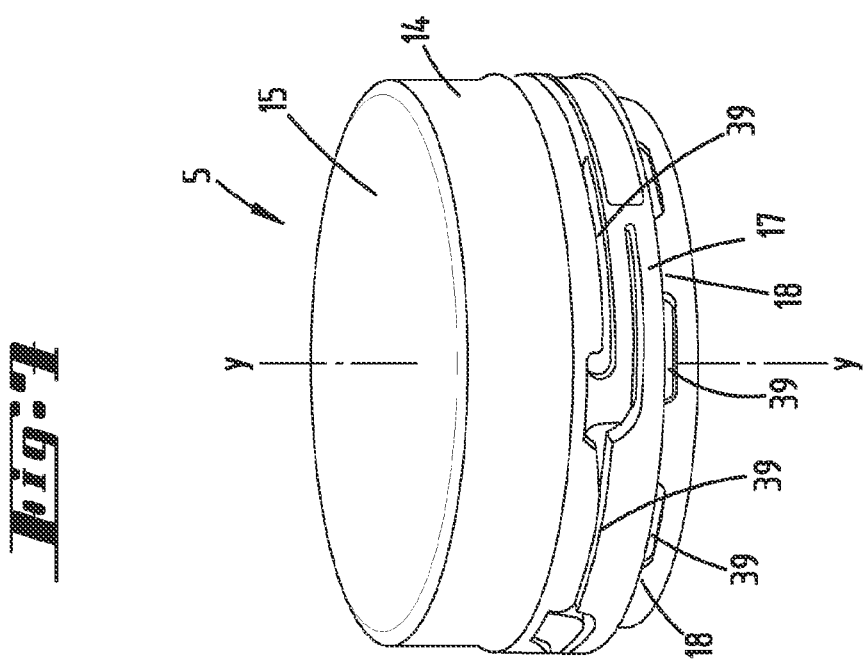

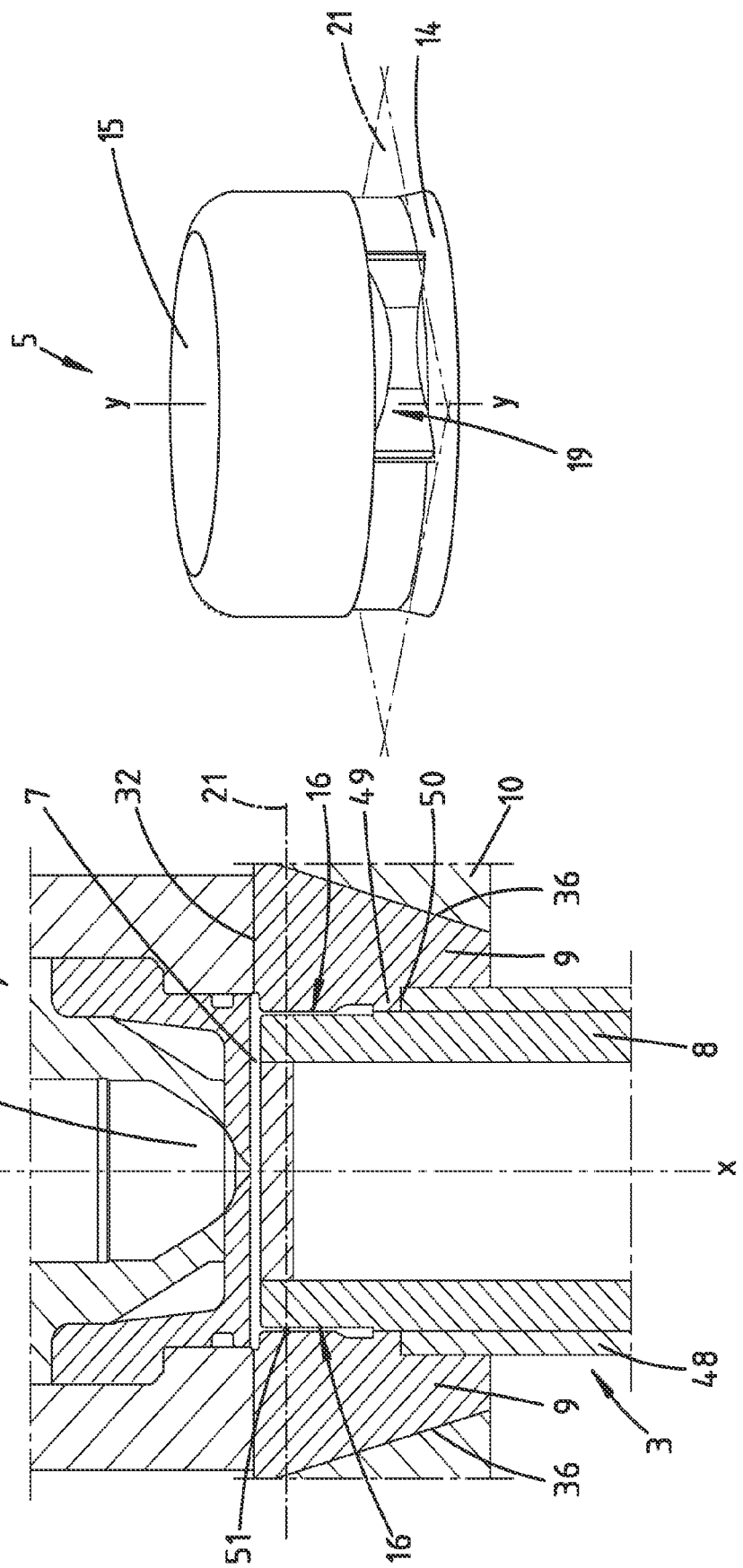

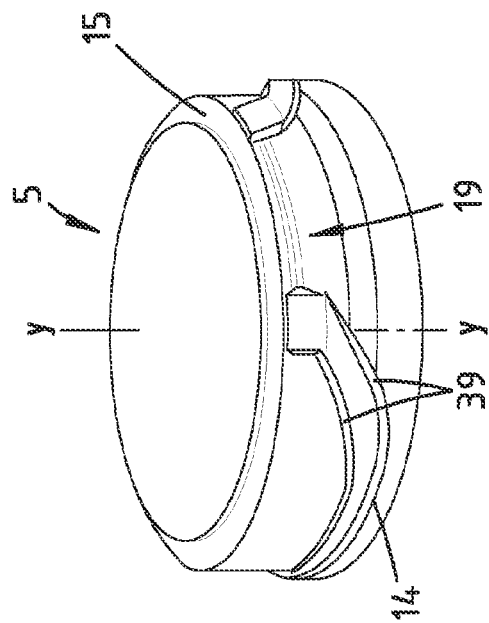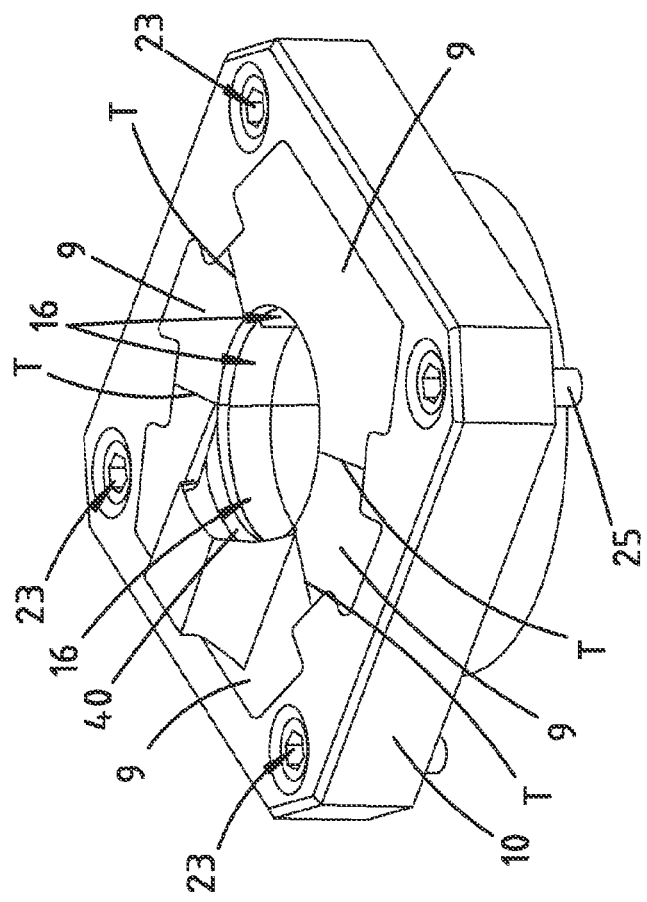

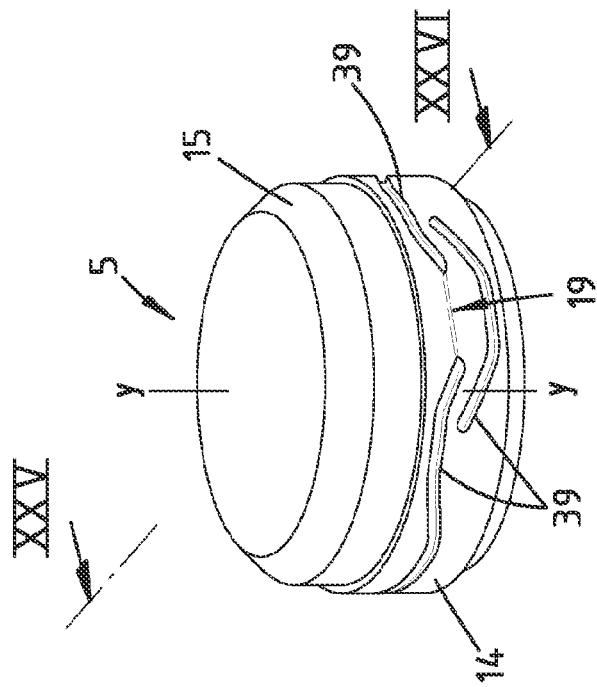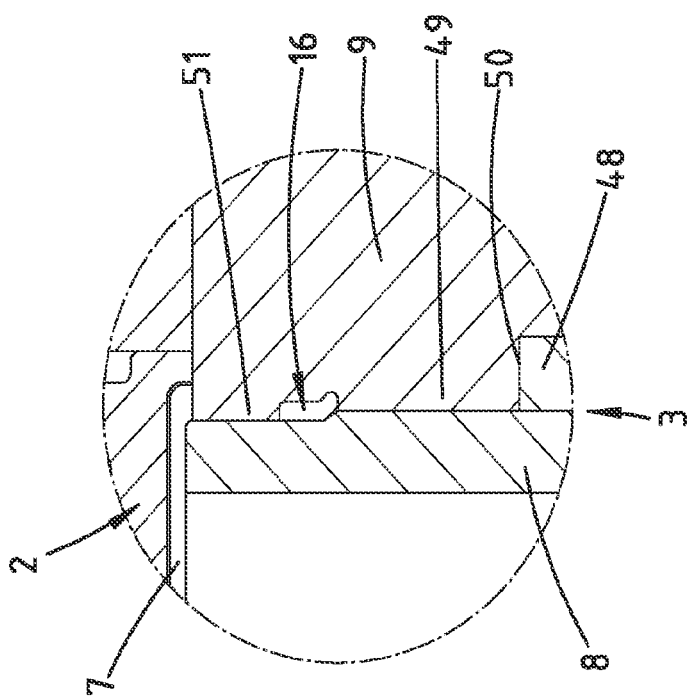

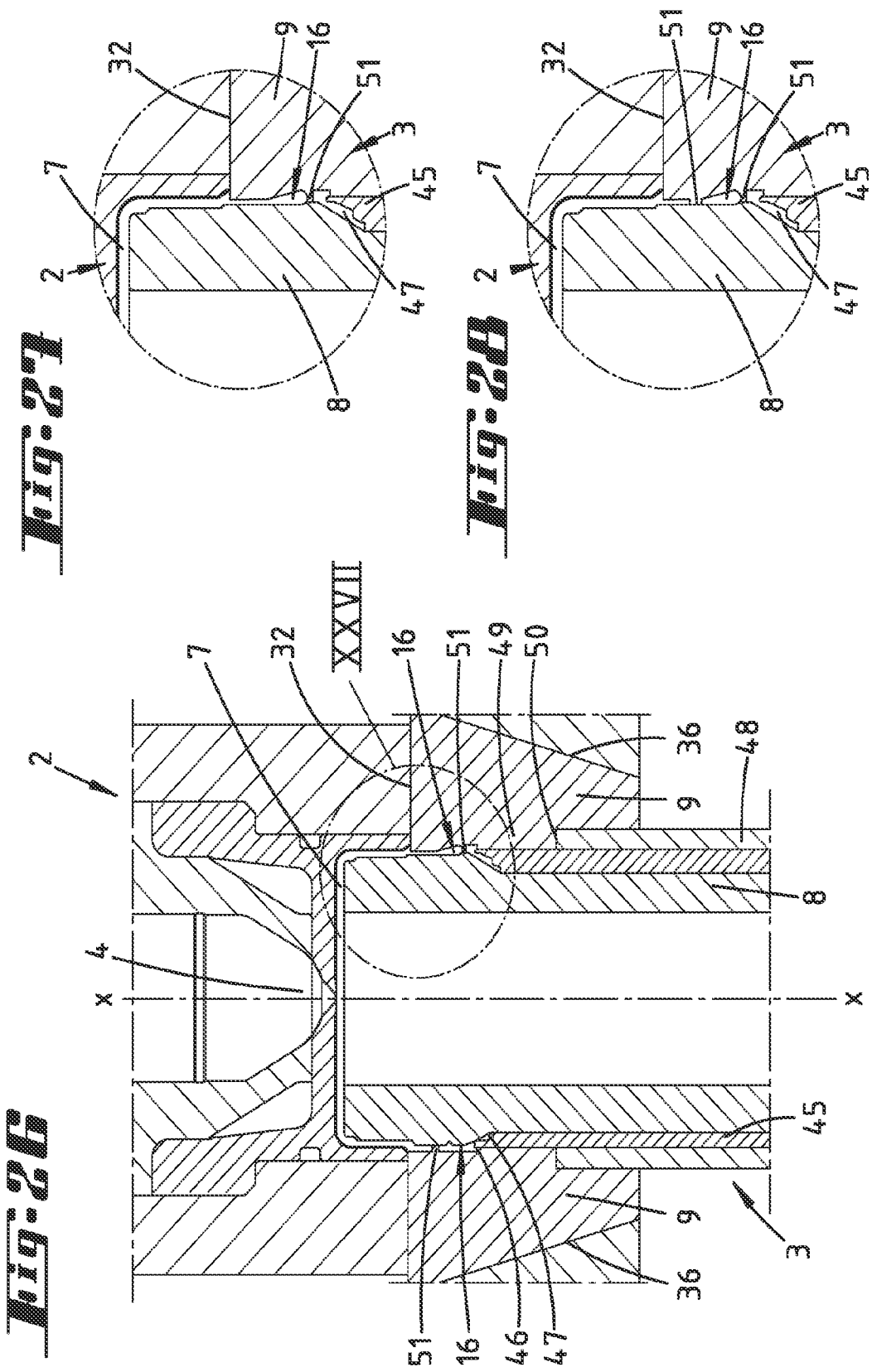

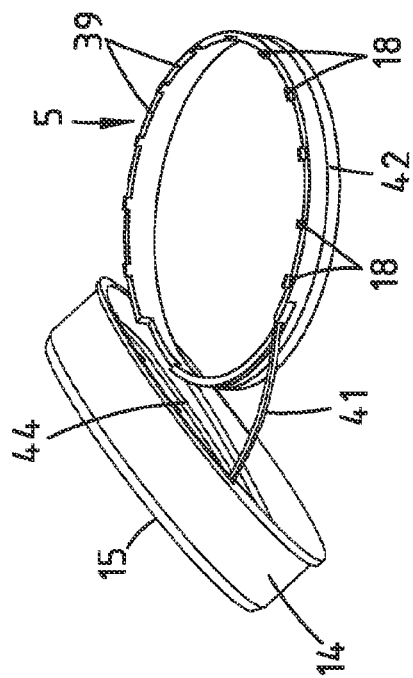
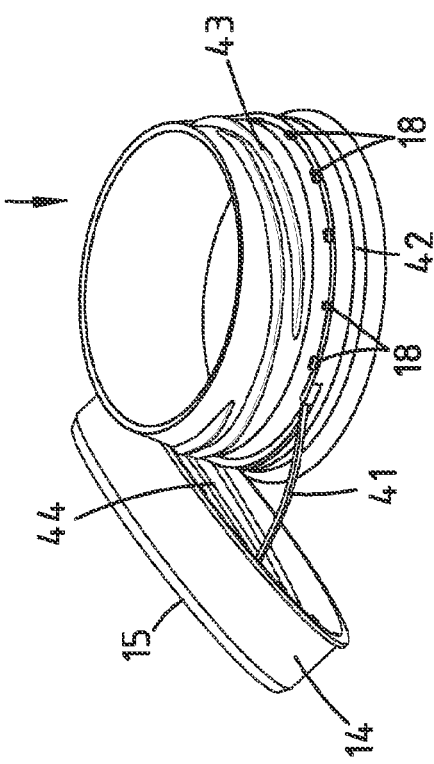
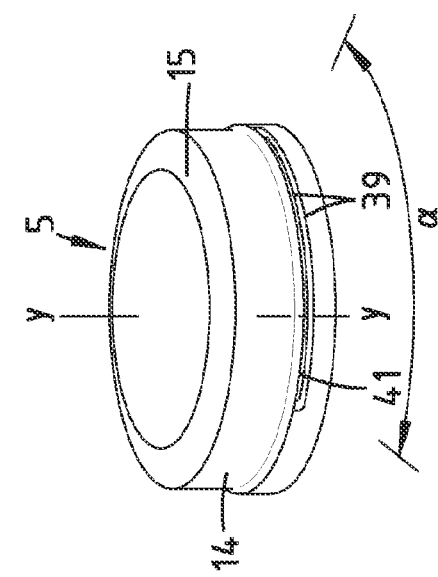

PLASTIC INJECTION TOOL FOR PRODUCING A CLOSURE CAP, AND METHOD FOR PRODUCING A CLOSURE CAP

CROSS REFERENCE TO RELATED APPLICATIONS

This application is the National Stage of PCT/EP2021/070813 filed on Jul. 26, 2021, which claims priority under 35 U.S.C. § 119 of German Application No. 10 2020 119 585.0 filed on Jul. 24, 2020, the disclosure of which is incorporated by reference. The international application under PCT article 21(2) was not published in English.

FIELD OF TECHNOLOGY

The invention relates to a plastic injection tool for producing a closure cap with a cap body and a cap cover formed integrally with and of the same material as the cap body, wherein the cap cover can be formed as cap lid, which can be moved relative to the cap body, wherein the injection tool is further divided into first and second mold halves, which can be displaced relative to one another, and wherein an injection nozzle is formed in the first mold half, wherein sliding jaw tool parts, which can simultaneously be moved in an injection direction of the produced closure cap and perpendicular to the ejection direction, are further formed in the second mold half radially outside to a central tool core, and a partial injection contour of the cap body is in each case formed in the sliding jaw tool parts, wherein the partial injection contours, combined in a circumferential direction of the closure cap result in a complete injection contour of the part of the cap body, which is formed by the sliding jaw tool parts, wherein an ejector is further provided assigned to the second mold half, for ejecting the produced closure cap.

The invention further relates to a method for producing a closure cap in a plastic injection tool, wherein the closure cap has a cap body and a cap cover formed integrally with and of the same material as the cap body, wherein the cap cover is further preferably formed as cap lid, which can be moved relative to the cap body, wherein the injection tool is divided into first and second mold halves, which can be displaced relative to one another, and wherein an injection nozzle is formed in the first mold half and sliding jaw tool parts are formed in the second mold half.

PRIOR ART

Plastic injection tools as well as methods for producing a closure cap in such a plastic injection tool of the type in question are known. These tools and methods are used in particular for producing plastic closure caps, wherein plastic closure caps of this type are further used in particular for closing beverage receptacles. The cap body is thereby formed essentially by means of a for example essentially circular ring-shaped, cylindrically revolving wall, which is covered by the cap cover. The cap cover can be connected firmly to this revolving wall or to the cap body, respectively, and can optionally be formed integrally with and of the same material as the cap body, further for example for forming a screw cap. The cap cover can also be formed as cap lid so as to be movable relative to the cap body, in particular able to possible pivotably movable about a hinge axis, which is provided transversely to a cap longitudinal axis, around which cap longitudinal axis the wall preferably revolves.

A plastic injection tool of the type in question is known from EP 2 052 834 B1. In the second mold half, it has sliding jaw tool parts, which, after performance of the injection process for producing the plastic closure cap in the course of an ejection process, are displaced in the ejection direction and simultaneously perpendicular thereto. Combined in the circumferential direction, this plurality of sliding jaw tool parts form a complete injection contour, in particular the injection contour of the second mold half, for example for forming a closure cap with tamper indicating band.

Comparable tools or methods for the production of a closure cap by means of a plastic injection tool are also known from US 2001/0015341 A1 and EP 1 905 566 A1. Sliding jaws as tool parts provide in each case a partial injection contour being the same each other. The sliding jaws tool fits also in a longitudinal section only in uniformly surface area to the tool core.

SUMMARY OF THE INVENTION

With regard to the above-described prior art, the invention has the object of designing a plastic injection tool as well as a method of the type in question in a further improved manner.

This object is solved in view of a plastic injection tool which is focused on that two or more sliding jaw tool parts have different partial injection contours to each other such that individually produceable and exchangeable sliding jaw tool parts are made with a certain, at least concerning a further sliding jaw tool part different partial injection contour is made and that a sliding jaw tool part in the ejection direction prior to the ejection of the closure cap is in attachment to the tool core in areas being spaced to each other in the ejection direction and being one behind the other, the areas are visible together in a section through the second mold half in which section a longitudinal axis of the closure cap runs in form of a line.

This object is solved in view of a method for the production of a closure cap whereby is focused on that the plurality of sliding jaw tool parts in view of a partial injection contour is the same or at least almost the same whereas a sliding jaw tool part has concerning a further sliding jaw tool part different partial injection contour, further in that in the same injection process the closure body is built in the plastic injection tool with concerning the circumference different layout concerning the sliding jaw tool parts and in that the cap ceiling in the first mold half is built and in that a sliding jaw tool part in the ejection direction prior to the ejection of the closure cap is attaching to the tool core at two areas which are in the ejection direction one behind the other and distant to each other, as they are visible together in a section through the second mold half in which section a longitudinal axis of the closure cap runs as a line.

As a result of the proposed solution, an advantageous plastic injection tool as well as an advantageous method for producing a closure cap are created. It was surprisingly discovered that, with respect to a contact with the tool core, sliding jaw tool parts with two or more contact regions located one behind the other in the ejection direction, make it possible by means of the movement in an oblique direction to attain a demolding of the closure cap in a cost-efficient manner even if they are additionally formed with different partial injection contours. Closure caps of the above-described type, in particular with a contour, which is different over the circumference, in particular three-dimensional, in the region of the cap body, further in particular in the region of the revolving cap wall, can also be produced in a cost-efficient and precise manner by means of an injection tool and/or method of this type. Closure caps with comparatively complex cap bodies, which are optionally structured differently three-dimensionally over the circumference, or cap walls with further optionally different undercuts, can further be produced thereby in a cost-efficient manner in the same injection process. The individually producible and exchangeable sliding jaw tool parts are formed in a cost-efficient manner by means of a certain partial injection contour, which differs at least from a further sliding jaw tool part.

According to a preferred formation, the tool core is initially displaced over a displacement path of, for example, approximately 10 to 15 mm, further for example approximately 13 mm, in the ejection direction after completion of the injection process, wherein undercut regions, which optionally may result due to the given contact region, between the injected closure cap and the sliding jaw tool part of this sliding jaw tool part having the contact region, are entrained at least over a partial distance by means of the closure cap resting on the tool core. The sliding jaw tool part thereby performs a movement in the ejection direction as well as a movement transversely to this ejection direction in an overlapping manner, distancing itself from the closure cap, this further preferably along an oblique surface. If several up to all sliding jaw tool parts with contact regions are formed on the tool core, these several or all sliding jaw tool parts, respectively, can therefore also be entrained in the direction of their position, which releases the closure cap, over the closure cap in response to the movement of the tool core in the ejection direction.

Solely via such a dragging displacement over the injected closure cap, the sliding jaw tool parts can be moved in a defined displacement end position. Overlapped, optionally simultaneously or also time-shifted to the linear displacement of the tool core and the dragging displacement, which optionally results therefrom over the closure cap, the sliding jaw tool parts can also be acted upon via mechanical means in the direction of their position, which releases the closure cap, for example via pneumatically or hydraulically movable pistons.

By means of the arrangement of the sliding jaw tool parts in the second mold half, contours can be attained in the closure cap, preferably in the region of the cap body or of the cap wall, respectively, simultaneously with the formation of the cap cover, which, over the cap height viewed in the direction of the cap longitudinal axis, can also have several projections and recesses as well as undercut region, viewed in the ejection direction of the produced closure cap. This is attained in particular by means of the displacement movement of the sliding jaw tool parts in the course of the opening and preferably ejection of the injected closure cap, which is associated therewith. A funnel-like opening of the second mold half results, for example, as a result of displacement of the sliding jaw tool parts in the ejection direction and in a direction perpendicular to this ejection direction.

The partial injection contour of a sliding jaw tool part, but optionally also of several sliding jaw tool parts up to all sliding jaw tool parts, is formed so that, prior to performing the injection process when the mold halves of the injection tool are closed, regions of the partial injection contour contact the tool core. In the ejection direction, thus viewed in the cap longitudinal axis with reference to a completed closure cap, two or more contact regions of the partial injection contour, which are spaced apart from one another, can thus be given on the cool core. Plastic-free regions, for example slit-like or linear apertures result in these contact regions in the cap body, further for example for forming an advantageous tamper indicating band with a connecting band between the tamper indicating band and the further part of the closure cap, so that the tamper indicating band can be held in a captive manner even in the severed state, or also further for example for forming a hinge formation, further for example a so-called butterfly hinge formation.

The contact regions, which are spaced apart in the ejection direction, are shown themselves jointly in a cross section through the second mold half, in which cross section a linear ejection direction results or, with reference to the closure cap to be produced, respectively, a cap longitudinal axis runs linearly. The contact regions of a partial injection contour or of two overlapping partial injection contours can also be provided spaced apart from one another in the ejection direction as well as beyond that in the circumferential direction, so that these contact regions, which are spaced apart from one another in the axial direction, are not mandatorily represented in an above-described cross section.

The complete injection contour for the cap body or also of only a partial section of the cap body, further in particular optionally of a partial section of the revolving cap wall can, and as preferred, be designed differently, viewed over the circumference in the case of a distribution among two or more sliding jaw tool parts. Facing the closure cap to be produced, different partial injection contours, which, combined as a whole, form the complete injection contour of the cap body, can therefore be provided on the individual sliding jaw tool parts.

According to a possible design, a plurality of sliding jaw tool parts can be formed identically or at least approximately identically with respect to the above-described partial injection contour in the case of a plurality of sliding jaw tool parts in the second mold half, for example two or more, further for example up to five, six, or more, preferably four sliding jaw tool parts, while a sliding jaw tool part have a partial injection contour, which differs from the further sliding jaw tool parts. All sliding jaw tool parts can also be formed differently in this respect.

In the case of a preferred arrangement of four sliding jaw tool parts, for example to or three sliding jaw tool parts can thus be formed identically or approximately identically with respect to the respective partial injection contour, and two or one sliding jaw tool part differently compared thereto.

By means of the proposed plastic injection tool and the further proposed method, for example closure caps with undercut regions in the region of the cap body can furthermore be attained at different planes transversely to the ejection direction.

According to a possible design, the partial injection contour can thus form a joint formation, which is connected to the cap body as well as to the cap cover and which is formed completely in one or several partial injection contours. According to a possible embodiment, the contour of the joint formation can thereby solely be formed in a sliding jaw tool part, can therefore solely be given by means of the partial injection contour thereof. In the alternative, the contour of the joint formation can also extend for example over two sliding jaw tool parts following one another in the circumferential direction and therefore overlapping a preferably essentially vertical separating plane between these two sliding jaw tool parts.

The joint formation as a whole is further preferably given solely by means of the partial injection contour of the one or of the several sliding jaw tool parts. In the alternative, the joint formation can also be given over a partial region in the first mold half having the injection nozzle. A partial region of the joint formation in the first mold half is thereby preferably formed in an undercut-free manner in the demolding or ejection direction, respectively, and/or only with structures extending in the direction to the second mold half, which can further be formed so as to radially widen only in this direction, in order to also provide for a cost-efficient demolding in this regard.

By means of corresponding design of the sliding jaw tool parts, in particular the partial injection contour thereof, so-called snap hinges or also butterfly hinges, further for example hinges with trapezoidal elements, can be formed in a cost-efficient and precise manner on the closure cap. A separating plane, which preferably runs transversely to the ejection direction, between the cap body and the cap cover, which is thereby formed as cap cover, can thereby further result in the region of the hinge-like joint formation, wherein the design of the closure cap integrally with and of the same material is given via the hinge-like joint formation. The separating plane can also be given in the part of the cap body, which is located below the cap cover.

As a result of the proposed solution, a closure cap of this type with a cap lid, which can be pivoted away via a hinge formation, can furthermore also be produced in an advantageous manner in the plastic injection tool in the cap closed position.

In the alternative or also in combination with the above-described possible further design of the plastic injection tool, it can be provided according to a further solution that the closure cap has a tamper indicating band and that the injection contour for the tamper indicating band is formed completely in the complete injection contour of the cap body. Such a tamper indicating band is also known as tamper evident feature, for example in the case of so-called screw closure caps. In response to a first unscrewing of the closure cap from the closed receptacle, the tamper indicating band is torn off or ripped, so that the first use is marked. In the case of closure caps with a cap lid, which can be pivoted away, such a tamper indicating band can also be formed as tear-off band.

Such a tamper indicating band can, viewed for example over the circumference, be connected via individual webs, which can be torn off, to the cap body or the cap wall, respectively, and/or to the cap lid. Viewed over the circumference, the tamper indicating band can also have, for example, a handle in a section for the manual complete or partial tear-off and removal of the tamper indicating band.

The undercut regions, which also result in the case of such a tamper indicating band in connection with the cap body, viewed in the ejection direction of the produced closure cap, as well as protrusion and recess regions can be produced in a cost-efficient and precise manner by means of the proposed design of the second mold half with sliding jaw tool parts.

In further design, two continuous contact regions of the sliding jaw tool parts, overlapping over two sliding jaw tool parts, which are located one on top of the other and which extend over a circumferential angle of, for example, 20 degrees or more, up to a circumferential value of, for example 180 degrees or more, can be present, which form a band of the closure cap between one another, which is connected to the cap body on the one end and to the cap lid on the other end. As a result of such an advantageous formation of two partial injection contours of the sliding jaw tool parts, which are adjacent in the circumferential direction, a closure cap to be produced can be provided, for example, with one or several, in particular two lasso-like retaining bands, for the permanent connection of the cap cover to the cap body, which essentially forms a retaining ring, or of a tamper indicating band to the cap lid.

The contact regions can thereby extend, for example, over a circumferential angle of approximately 20 degrees up to approximately 60 degrees or more, further for example up to approximately 75 degrees.

Viewed in the circumferential direction, for example two contact formations of this type can also be given for the formation of two bands.

For the formation of a web-like connection of the band to the cap body or to the cap cover, respectively, as well as for the further circumferential formation of an optionally linear separating region between cap cover and cap body, a course of the respective contact region, which changes over the axial height of the closure cap or a course of the respective contact region, which changes in the ejection direction, respectively, can result in the circumferential direction.

Over the circumference, different partial injection contours can thus further complement one another to form a band contour, which rises and/or falls in the axial direction, which is limited in a width direction of the band contour by contact ribs running according to the band contour.

In a further design, the ejector can be axially covered by the sliding jaw tool parts with regard to the closure cap prior to the ejection. In the case of such a design, the ejector preferably does not form a (bottom-side) partial region of the injection contour in the second mold half. On the contrary, this mold section, which forms the region of the lower freely revolving edge of the cap body, is (also) formed by the partial injection contours of the sliding jaw tool parts. With a contact region, which in each case captures the lower free edge of the cap body from below, they reach all the way to the tool core in the radial direction. At the beginning of the ejection process in the ejection direction, the ejector lies at a distance from the closure cap through the jaw region, which captures the cap body from below. For ejecting the closure cap, a displacement of the sliding jaw tool parts takes place in and perpendicular to the ejection direction, preferably in a leading manner or synchronized to the linear displacement of the ejector, respectively, whereby a path for the ejector is released for the corresponding ejection impact of the closure cap in the region of the lower edge section thereof.

At the beginning of an ejection process, the tool core can further displace into a forward position by means of the sliding jaw tool parts and the closure cap. Such a displacement of the tool core into the forward position can be given solely or partially as a result of an entrainment via the undercut, which is still given at the beginning of the ejection process, between the partial injection contours of the sliding jaw tool parts and the injected closure cap. A mechanical coupling of the movement of the sliding jaw tool parts in and perpendicular to the ejection direction and of the displacement movement of the tool core into the forward position can also be given.

The second mold half can have a ring part, which preferably has an approximately square outline. The sliding jaw tool parts can be movably received in the ring part on the inner side. The ring part can, as also preferred, provide a guide for each individual sliding jaw tool part, for example in the manner of a groove-spring guide.

The ring part can thereby further be fastened to a tool receiving part. This can be a reversible fastening, wherein the tool receiving part is preferably a rigid, further preferably non-displaceable device part. Via the fastening of the ring part, the sliding jaw tool parts can be positioned indirectly via the second mold half or the second mold half can be positioned directly in the device, respectively, to produce an injection molded part.

According to a preferred design, the ring part can be movably fastened to the tool receiving part in a plane perpendicular to the ejection direction in order to attain an exact alignment of the two mold halves as well as preferably of the sliding jaw tool parts to the first mold half. This preferably results quasi in a floating support of the ring part and thus of the sliding jaw tool parts, which are guided on the ring part, or of the second mold half, which is connected to the ring part, respectively, so that an exact alignment of the mold halves in a direction transversely to the ejection direction or in a direction transversely to the joining direction of the mold halves, respectively, can be attained optionally, as also preferred, prior to performing an injection process, but also in the course of the injection process.

An exact alignment of the mold halves to one another is required in particular in the case of a separating crack between the mold halves within the cap body of the closure cap, which is to be produced, which can be attained by means of the above-described floating support of the ring part and via this of the sliding jaw tool parts or of the second mold half as a whole.

The above-described movability of the ring part transversely to the ejection direction is preferably limited, in particular stop-limited. A corresponding movability of the ring part in the direction of a radial line, which is aligned to a central axis running in the ejection direction, can thus further preferably be given in the single digit millimeter range, thus for example over a range of from, for example, 0.1 to 0.5 mm up to for example 1 or 2, further up to for example 3 mm or more, for example up to 5 mm.

A holding element for the ring part can thus further be provided, which is fastened to the tool receiving part by interconnecting a sleeve, wherein a passage bore of the ring part, through which the holding element extends with the sleeve, leaves a free space to the sleeve. The ring part is preferably held on the tool receiving part in the ejection direction via the holding element, while the holding element further forms a stop element for the ring part directly or indirectly via the sleeve, in order to provide for a limited movability of the ring part perpendicular to the ejection direction. The degree of the movability is thereby specified in particular and preferably by the distance dimension between the bore wall of the ring part and the revolving sleeve wall, wherein an annular space preferably further results between the bore wall of the ring part and the revolving sleeve wall.

In further design, the holding element can be a screw, which can be screwed into an adapted threaded bore of the tool receiving part. The screw shaft can thereby pass through the preferably provided sleeve. A securing of the ring part in particular in the ejection direction is given via the screw head.

The fastening of the ring part can furthermore also take place by means of a holding element, which can be formed, for example, as bolt with a protrusion, which can be made effective, for example, by rotating. A holder, for example according to the key-keyhole principle, can be given thereby, in the case of which a protrusion, which protrudes essentially radially to the bolt, for example in the manner of a key bit, can be moved by rotation about the bolt longitudinal axis into an undercut position to an adapted opening in the tool receiving part. In this undercut or locking position, respectively, the ring part is secured to the tool receiving part. This is preferably a thread-free fastening of the ring part, further for example in the manner of a bayonet closure or further for example in the manner of a quick release.

To provide for the above-described floating support of the ring part, the bolt can pass through the mentioned sleeve.

As a result of this further proposed design, a cost-efficient and quick assembly as well as disassembly of the ring part or of the mold half, respectively, results.

The proposed fastening of the ring part or of the mold half, respectively, in particular the thread-free fastening, is also significant alone and on its own, is to therefore also be considered independently of the further features according to the invention of the plastic injection tool.

A further design, in the case of which the mold halves have one or several protrusions and recesses, which effect an alignment relative to one another in the course of bringing together the mold halves, can be significant, considered in connection with the above-described features as well as on its own. According to a possible design, the protrusions can thereby be assigned solely to the one mold half, and the recesses solely to the other mold half. With regard to this it is also possible to equip each mold half with protrusions as well as with recesses, which can therefore cooperate in a centering manner with recesses and protrusions of the other mold half.

The protrusions can be formed, for example, in a cone-like manner or web-like manner with circular or also polygonal, for example quadrangular outline.

The above-described floating support of the ring part or of the mold half, respectively, lends itself in an advantageous manner for the positive cooperation of the mold halves given in this way for the exact alignment of the mold halves to one another.

BRIEF DESCRIPTION OF THE DRAWINGS

The invention is described below by means of the enclosed drawing, which, however, only represents exemplary embodiments. A part, which is described only with respect to one of the exemplary embodiments and which, in the case of a further exemplary embodiment, is not replaced by a different part due to the special feature emphasized therein, is thus also described as at least a possible part, which is present, for this further exemplary embodiment. The drawing shows:

FIG. 6 the sliding jaw tool parts of the second mold half in a schematic illustration;

FIG. 7 a closure cap, which is produced, for example, by means of the injection tool of the first embodiment, in perspective illustration;

FIG. 8 the enlargement of the region VIII in FIG. 3;

FIG. 18 a sectional illustration through mold halves, for producing a closure cap according to FIG. 17, which sectional illustration results along a cutting line XVIII-XVIII through such a closure cap, which is to be produced in these mold halves;

FIG. 19 an illustration corresponding to FIG. 17, relating to a further embodiment of the closure cap with joint formation;

FIG. 20 a perspective top view onto a second mold half in a further embodiment, with sliding jaw tool parts of different sized in the circumferential direction;

FIG. 21 a closure cap produced by using the second mold half according to FIG. 20, in perspective illustration;

FIG. 24 the enlargement of the region XXIV in FIG. 23;

FIG. 25 a further closure cap in perspective illustration;

FIG. 26 a sectional illustration through mold halves according to FIG. 23, which sectional illustration results along a cutting line XXVI-XXVI through such a closure cap according to FIG. 25, which is to be produced in these mold halves;

FIG. 27 the enlargement of the region XXVII in FIG. 26;

FIG. 28 an illustration corresponding to FIG. 27, relating to an alternative embodiment;

FIG. 29 a perspective illustration of a closure cap with tamper indicating band, relating to a further embodiment;

FIG. 30 the closure cap according to FIG. 29 according to circumferential separation of the cap body from the tamper indicating band, by maintaining a connection of the cap body to the tamper indicating band via a provided retaining band;

FIG. 31 an illustration corresponding to FIG. 30, relating to an alternative design of the closure cap;

DESCRIPTION OF THE EMBODIMENTS

Figure 1:
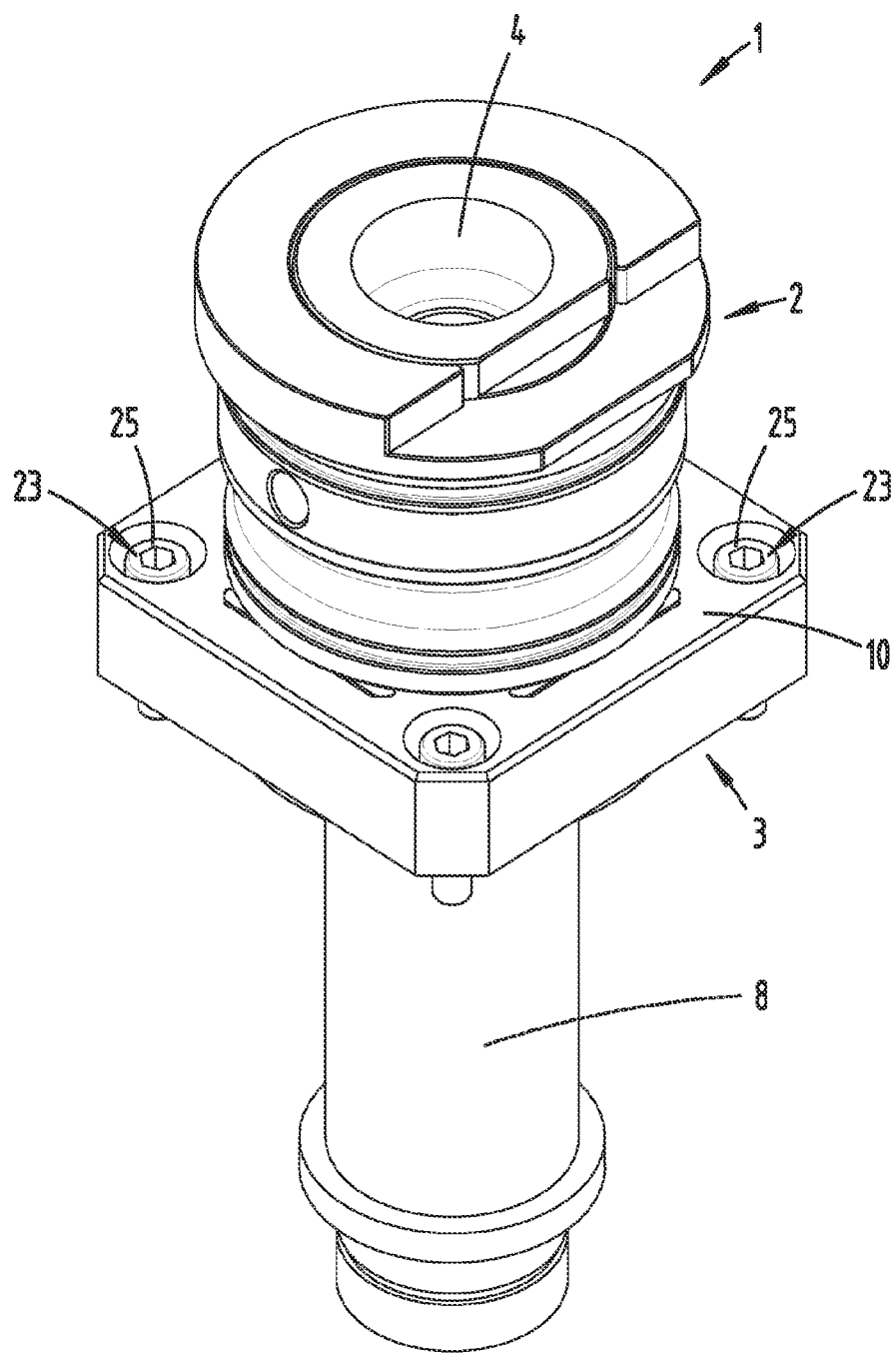
FIG. 1 the plastic injection tool in perspective illustration, relating to a first embodiment.
Figure 2:
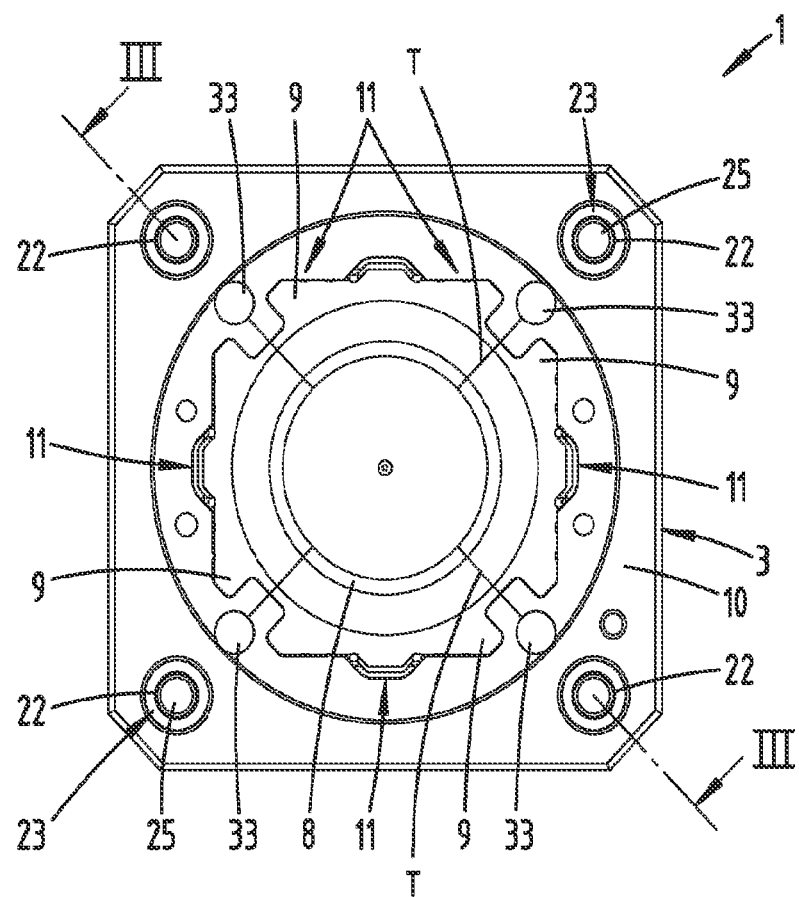
FIG. 2 the bottom view against the injection tool by leaving out a tool core.

What is illustrated and described, initially with reference to FIG. 1, is a plastic injection tool 1, which is shown partially only schematically in the illustrations.

The plastic injection tool 1 has essentially two mold halves, a first, in the illustration upper, mold half 2, and a second, in the illustration lower, mold half 3.

One of the mold halves can be displaceable relative to the other mold half along a geometric displacement axis x.

Figure 3:
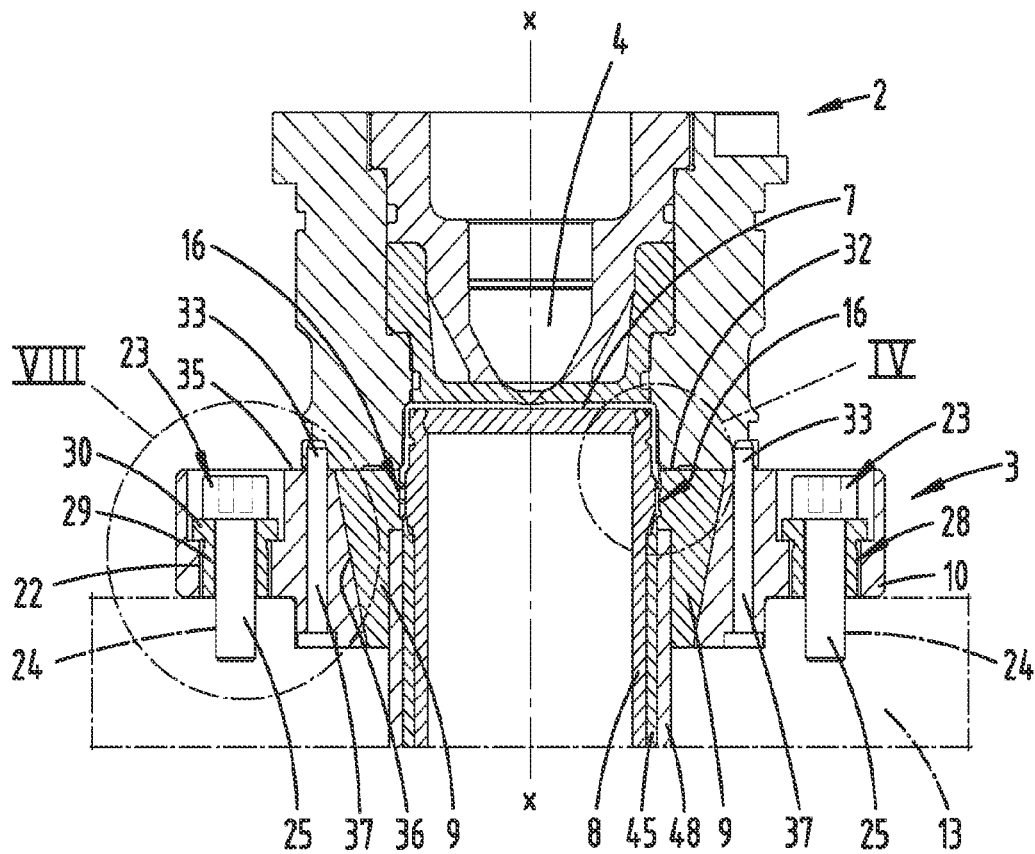
FIG. 3 the section according to the line III-III in FIG. 2 with tool core.

An injection nozzle 4 is preferably provided in the first mold half 2, via which in a mold half closed position according to FIG. 3 for producing an injection part for example in the form of a closure cap 5, a plastic mass 6 is introduced into a cavity 7 resulting between the mold halves 2 and 3. The cavity 7 can be limited radially on the inside by means of a tool core 8 of the second mold half 3.

The cavity 7 can further be limited by one or several sliding jaw tool parts 9, in particular for forming undercut regions 12 on the closure cap 5, which is to be produced. With reference to the displacement axis x, several, for example four sliding jaw tool parts 9 can thus be provided circumferentially. Each sliding jaw tool part 9 can thereby extend in the circumferential direction over an identical circumferential angle in the region (partial injection counter 16) facing the cavity 7, which is to be limited. In the case of four sliding jaw tool parts thus extend for example over a circumferential angle of 90 degrees each. In this respect, sliding jaw tool parts 9 can also be provided with circumferential angles, which are different in the region of the partial injection contour 16.

According to a longitudinal section (see FIG. 3), the outer wall of a sliding jaw tool part 9 preferably runs in a wedge-shaped manner, thereby widening in the direction of the first mold half 2.

Together, the sliding jaw tool parts 9 form a complete injection contour, which revolves with respect to the displacement axis x, of the second mold half 3, in particular to limit the cavity 7 in the region of a cap body 14 of the closure cap 5, which is to be produced. In the axial direction, the complete injection contour of the sliding jaw tool parts 9 can thereby extend essentially over more than half up to the entire axial height of the cap body 14, which essentially forms the cap wall. A possible (upper) remaining section of the cap body 14, which preferably does not have any undercut regions 12, as well as a cap cover 15, which is preferably formed integrally with and of the same material as the cap body 14, preferably find their outer complete injection contour in the first mold half 2, but can partially also be formed by means of the partial injection contours 16 of the sliding jaw tool parts 9.

An, optionally step-shaped, separating crack can therefore result between the mold halves in the transition from cap body 14 to the cap cover 15 or even within the axial extension of the cap body 14.

Part of the lower, second mold half 3 can also be a mold section 45, which surrounds the tool core 8 in the region of a radially outer side cut of the tool core 8, for example to provide for the production of a section 47, which protrudes radially beyond the inner cap wall surface in the region of the lower edge 46 of the closure cap 5. This section 47 can form, for example, a tamper indicating band.

An essentially sleeve-like ejector 48 is further preferably provided radially revolving to the tool core 8, thereby surrounding the optionally provided mold section 45.

Figure 4:
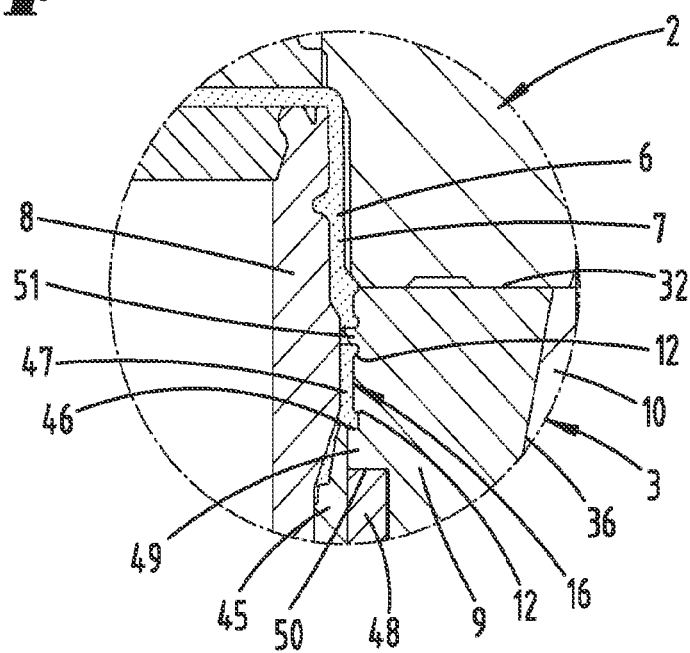
FIG. 4 the enlargement of the region IV in FIG. 3.

During the injection process and prior to the beginning of the ejection process for example according to the illustration in FIG. 3, the edge of the ejector 48 pointing upwards is in the axial or in the ejection direction r, respectively, by means of a contact region 49 of the sliding jaw tool part 9 on the tool core 8 and/or on the mold section 45 at a distance from the edge 46, which is to be acted on by the ejector 48, of the closure cap 5, which is to be produced (see also for example FIG. 4).

A contact surface 50 of the sliding jaw tool parts 9 can result for the front surface of the ejector 48, via which the ejector 48 can initially, as a result of the axial displacement thereof in the ejection direction r, entrain the sliding jaw tool parts 9 after the injection process and subsequently introduced ejection process. The latter are displaced due to the wedge guide in and perpendicularly radially outside to the ejection direction r, thereby release the injection molded part (closure cap 5) as well as the ejection path for the ejector 48, so that the latter can move on the underside against the edge 46 of the closure cap 5 resting on the tool core 8, for ejecting same from the tool core 8 (see FIG. 5).

Figure 5:
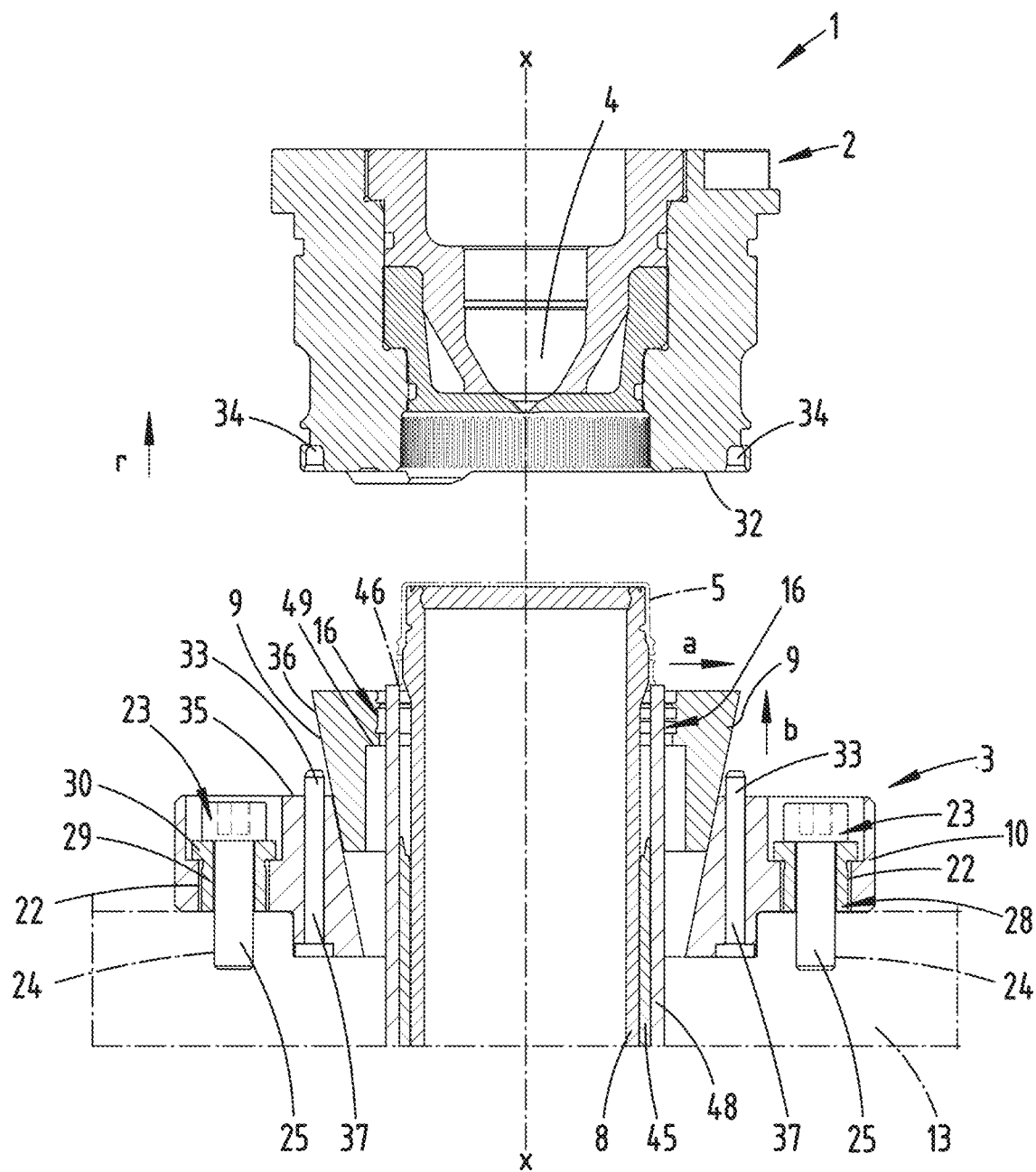
FIG. 5 a sectional illustration corresponding essentially to FIG. 2, relating to the ejection position.

In the course of the ejection movement, the tool core 8 can traverse into a forward position, as illustrated in FIG. 5, while the optionally provided further mold section 45 optionally remains in its initial position.

In one embodiment, the tool core 8 can initially move forward, initially via a linear displacement path of, for example, 10 to 15 mm, further for example approximately 13 mm, in the ejection direction r, wherein a dragging entrainment of the sliding jaw tool parts 9 in the direction of their closure cap release position can result over the produced closure cap 5 as a result of a positive-type cooperation of preferably formed separating regions 39 of the injected closure cap 5 and of contact regions 51 of the sliding jaw tool parts 9 on the tool core 8.

An active displacement of the sliding jaw tool parts 9 can also take place in a time-shifted manner thereto, but optionally also simultaneously thereto, for example via the above-mentioned ejector 48 or via separate mechanical application means.

The partial injection contours 16 of the individual sliding jaw tool parts 9 can be identical, but also different, as illustrated preferably and schematically in FIG. 6. A tamper indicating band 17, which is connected to the wall of the cap body 14 via webs 18, which can optionally be torn off (see FIG. 7), can thus be integrally formed in the sliding jaw tools 9 on the base side of the cap body 14 by means of these partial injection contours 16.

In the alternative, a closure cap 5 with a cap cover 15, which is movable, in particular pivotably movable relative to the cap body 14, can also be produced in the manner of a cap lid by means of the different partial injection contours 16 of the sliding jaw tool parts 9. Such a closure cap 5 is illustrated, for example, in FIGS. 17 and 19 in different embodiments.

Figure 16:
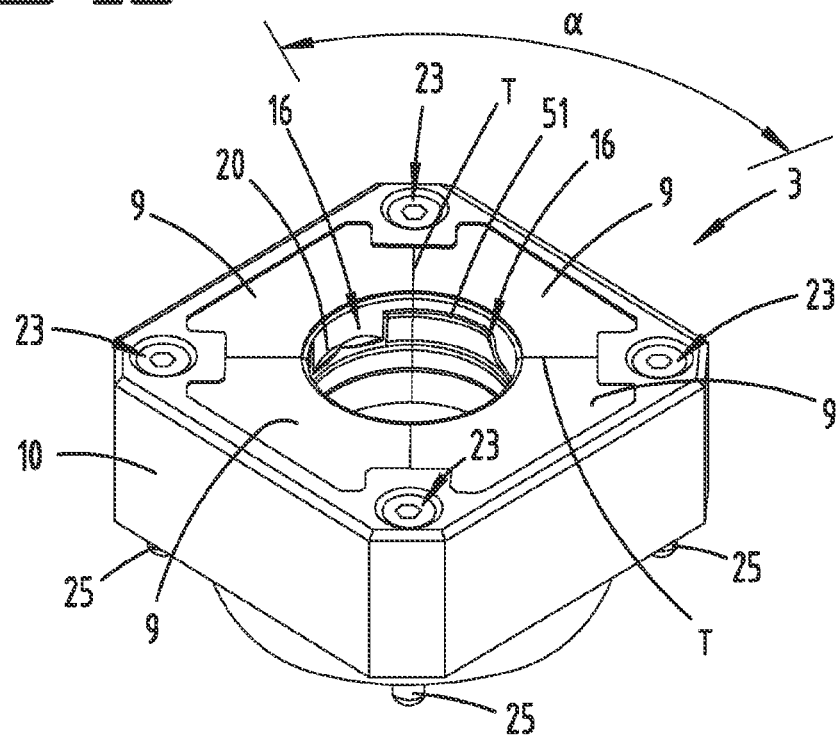
FIG. 16 an illustration according to FIG. 10, but with alternative sliding jaw tool parts.

The partial injection contour 16 of at least one sliding jaw tool 9 can thus have a separate structure 20 for forming a joint formation 19 in the cap body 14 (see FIG. 16). The joint formation 19, which is to be produced, is thereby positioned in such a way that it is connected to the cap cover 15 as well as to the cap body 14, wherein a separating plane 21, which is aligned essentially transversely to the cap axis, which runs along the displacement axis x in the course of the production, can result between cap cover 15 and cap body 14.

The separate structure 20 can represent itself solely and completely in a sliding jaw tool part 9. In the alternative, however, the separate structure 20 can also extend over for example two sliding jaw tool parts 9, which follow one another in the circumferential direction, thereby therefore bridging a separating plate T between the tool parts 9 (see, for example, FIG. 12).

The sliding jaw tool parts 9 or the partial injection contours 16 thereof, respectively, can further, and as preferred, be formed so that contact regions 51, which lie one behind the other in the ejection direction r or in the direction of the displacement axis x, respectively, and which are spaced apart from one another in the above-described direction result on a sliding jaw tool part 9 or also on two or more sliding jaw tool parts 9, which optionally connect to one another in the circumferential direction, by means of which the sliding jaw tool parts 9 or the partial injection contours 16 thereof, respectively, contact the tool core 8 during the injection process and prior to the ejection process.

Plastic-free separating regions 39, which preferably do not revolve completely and which optionally run linearly, result in the circumferential direction in these contact regions 51 on the produced closure cap 5, preferably in the cap body 14 or between cap body 14 and cap cover 15, respectively.

Figure 33:
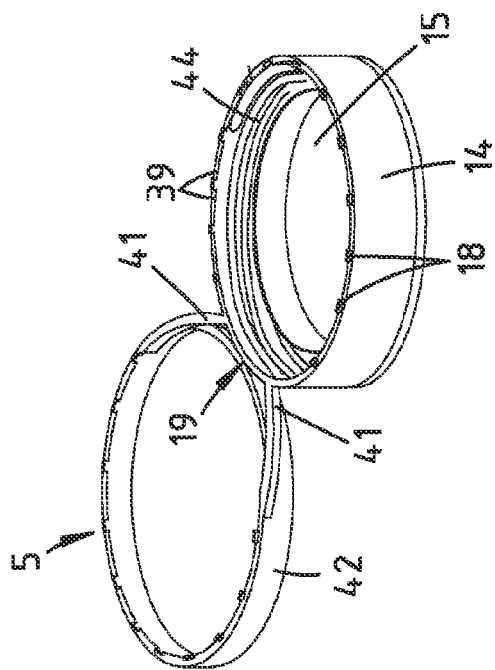
FIG. 33 an illustration essentially corresponding to FIG. 30, but relating to the closure cap according to FIG. 32.
Figure 34:
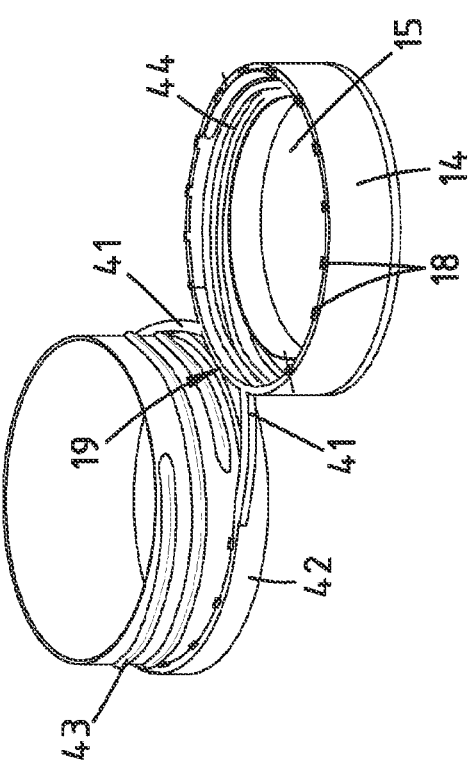
FIG. 34 an illustration corresponding to FIG. 33, relating to an alternative design of the closure cap.
Figure 32:
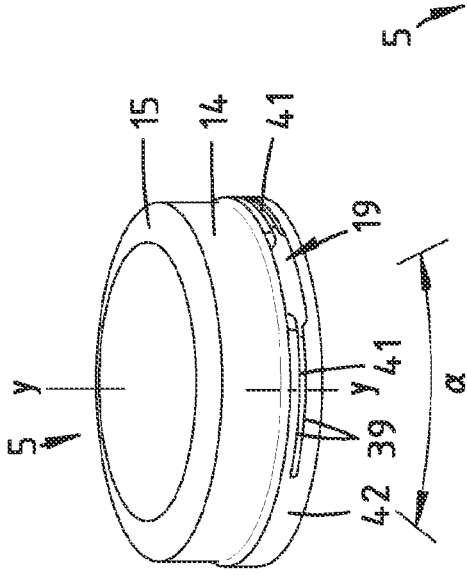
FIG. 32 a further embodiment of a closure cap with tamper indicating band in perspective illustration.

These contact regions 51 can in each case extend over a circumferential angle α of approximately 3 to 10 degrees, further for example approximately 5 degrees, repeating in the circumferential direction, thus for example to form webs 18, in particular tear-off webs (see, for example, FIGS. 30 and 33).

In the circumferential direction, such contact regions 51 can also extend—optionally bridging a separating plane T between two sliding jaw tool parts 9 following one another in the circumferential direction—over a circumferential angle α of approximately 20 degrees or more, thus for example 30 to 60 degrees. A formation of this type provides the advantageous formation of a band, in particular of a retaining band 41, or of a plurality of such bands, which band results between the contact regions 51.

Such a band, for example retaining band 41 (to that end, also see the following description relating to the embodiments of FIGS. 29 to 34), is preferably connected to the cap cover 15 in the region of an end viewed in the circumferential direction, and to the cap body 14, which can form a retaining ring 42 in this case, on the other end.

Viewed in the circumferential direction, one or several of the above-described contact regions 51 can be formed so as to run in a plane, viewed transversely to the displacement axis x. Such a contact region 51 can also leave this plane in the circumferential direction, for example to form a step-shaped course of a separating region 39 in the cap body 14.

Figure 17:
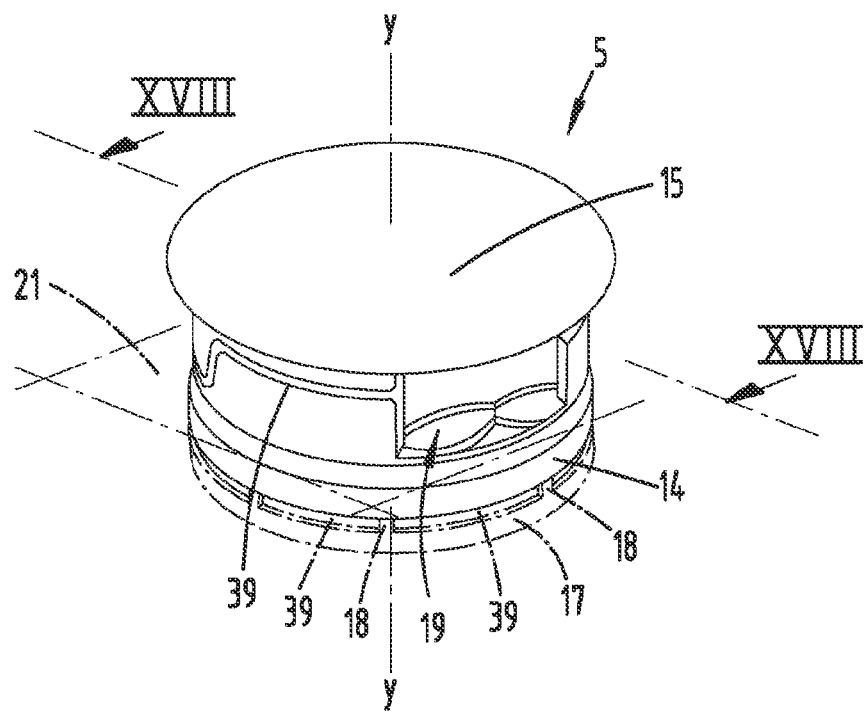
FIG. 17 an alternative closure cap in perspective illustration, for example produced by using sliding jaw tool parts according to FIG. 16.

FIG. 17 shows a closure cap 5 with a joint formation 19, which connects the cap body 14 to the cap cover 15. In the illustrated exemplary embodiment, said joint formation is designed in the manner of a butterfly joint. The linear separating region 39 between the outer edges of cap body 14 and cap cover 15, which point towards one another, runs in a step-like manner, viewed over the circumference, therefore in a partially offset manner in the direction of a cap longitudinal axis y.

This offset course shows itself in the partial injection contours 16 of the sliding jaw tool parts 9 by means of a correspondingly formed contact region 51, in particular in three of the total of four tool parts. The fourth sliding jaw tool part 9 preferably has the separate structure 20 for forming the joint formation 19 (see FIG. 16).

A sectional illustration of the first and second mold halves 2 and 3 is shown in FIG. 18, with sliding jaw tool parts 9 for producing a closure cap 19 according to FIG. 17. The sectional plane is thereby selected according to the cutting line suggested on the closure cap 19 in FIG. 17.

As can further be seen from the illustration in FIG. 17, such a closure cap 19 can also be formed with a tamper indicating band 17 in the region of the cap body 14 by means of corresponding adaptation of the sliding jaw tool parts 9, which tamper indicating band is connected to the cap body 14 on the underside of the cap body 14 via webs 18, which are provided in a circumferentially separated manner. Separating regions 39, which are kept free by means of correspondingly positioned contact regions 51 in the sliding jaw tool parts 9, result in the circumferential direction between the webs 18.

FIG. 21 shows a further embodiment of a closure cap 5, with a joint formation 19, which extends beyond the separating surface 32, which defines the separating crack between the mold halves 2 and 3, in the axial direction and in the direction to the cap cover 15. One of the sliding jaw tool parts 9 forming the respective partial injection contours 16 is provided with a contour section 40, which protrudes beyond the separating surface 32 in the axial direction.

The region, which is lateral for the joint formation 19 in the circumferential direction of the contour section 40, is limited by means of mold sections of the upper, first mold half 2. A nesting of the mold halves beyond the separating surface 32 results.

As can further be seen from the illustration of the respective second mold half 3 in FIG. 20, the individual sliding jaw tool parts 9 can have different circumferential extensions, in particular in the region of the respective partial injection contours 16, preferably in pairs. The sliding jaw tool part 9, for example, which has the above-described contour section 40, as well as the sliding jaw tool part 9, which is located diametrically opposite based on the displacement axis x, can thus have a circumferential length, which is greater in the region of the partial injection contours 16, for example by approximately 1.5- to 2.5-times greater, than the further sliding jaw tool parts 9, which are arranged in the circumferential direction between the above-mentioned sliding jaw tool parts 9.

Figure 23:
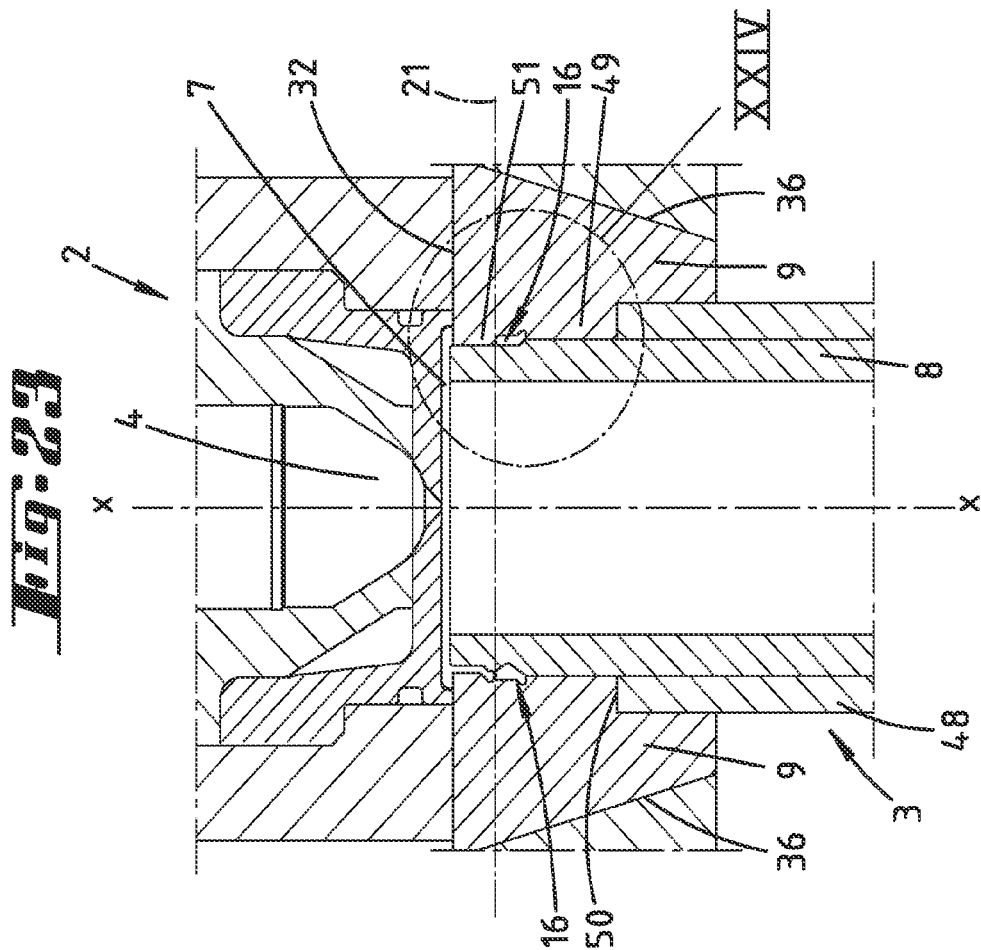
FIG. 23 a sectional illustration through mold halves, for producing a closure cap according to FIG. 22, which sectional illustration results along a cutting line XXIII-XXIII through such a closure cap, which is to be produced in these mold halves.
Figure 22:
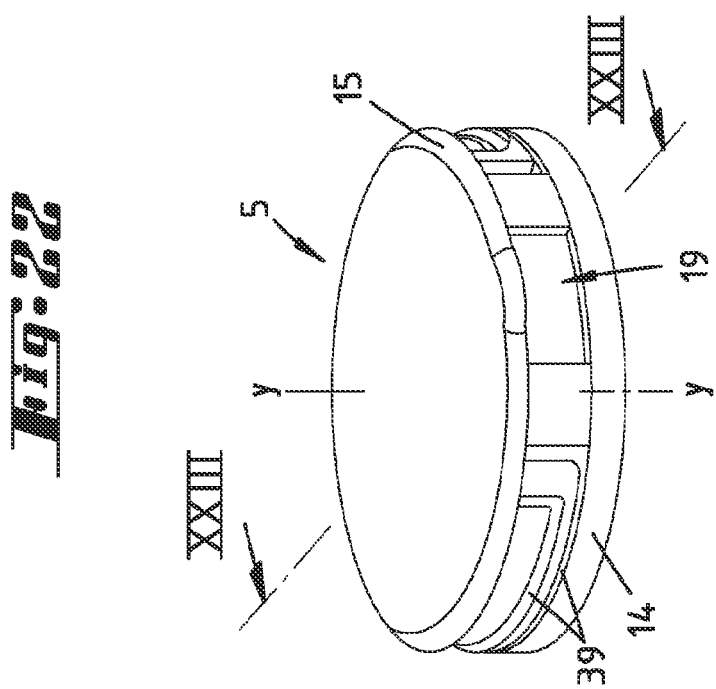
FIG. 22 a closure cap in a further embodiment.

FIGS. 22 and 25 show further examples for closure caps 5, which are produced in plastic injection tools 1 according to the invention. They have different forms of joint formations 19, via which the cap body 14 is connected to the cap cover 15. The further FIGS. 23 and 26, as well as the corresponding enlargements in FIGS. 24 and 27 show the corresponding first mold half 2 and second mold half 3 with the correspondingly formed partial injection contours 16 of the sliding jaw tool parts 9 in respective sectional illustrations. The sectional plane is thereby selected so that the respective illustrated cavity 7 provides for the production of a closure cap 5 according to FIG. 22 or 24, respectively, which is cut along the respective cutting line XXIII-XXIII or XXV-XXV, respectively. FIG. 28 shows a section, which is offset in the circumferential direction compared to FIG. 27.

Different exemplary embodiments of closure caps 5, which are produced by means of an injection tool 1 according to the invention, are further illustrated in FIGS. 29 to 34, in the case of which a connection of cap parts among one another is given via lasso-like retaining bands 41.

According to the embodiment of FIGS. 29 and 30, the cap body 14, together with the cap cover 15, which is formed in one piece, can thus further be tied to the retaining ring 42 via such retaining bands 41, even after a separation of webs 18, which connect the cap to a retaining ring 42 in the original state of the closure cap 5, along a tear-off line in the circumferential direction. In the common use state, the retaining ring 42 is preferably held, for example on a bottle neck, so as not to be capable of being removed in a destruction-free manner. After an opening of the closure cap 5, for example by means of an unscrewing of the cap, the cap is also tied via the retaining bands 41 to the bottle via the retaining ring 42 and is thus captively anchored.

The retaining ring 42 can furthermore simultaneously form the tamper indicating band.

Two retaining bands 41, in each case extending approximately over a circumferential angle of, for example, 30 to 40 degrees, can be formed spaced apart from one another in the circumferential direction, wherein a retaining band 41 is connected integrally with and of the same material on one end to the retaining ring 42, which can be formed by the cap body 14 alone, and on the other end to the cap cover 15. This connection is formed permanently, can therefore not be separated via a conventional force by tearing off.

In an original state of the closure cap 5, the cap cover 14 is further connected to the retaining ring 42 or to the cap body 14, respectively, via tear-off webs 18 along a tear-off line formed in the circumferential direction.

According to the illustration in FIG. 31, such a design can also be given in the case of a closure cap 5, in the case of which the retaining ring 42 simultaneously forms an unscrewing thread 43 for the cap-side thread 44.

According to the embodiments of the illustrations in FIGS. 31 to 34, such retaining bands 41 can simultaneously also form a joint formation 19.

As a result of the formation of the injection tool 1 according to the invention, the closure cap 5 with joint formation 19 can be produced in an advantageous manner—as illustrated—in the closed state of the cap 5.

Each sliding jaw tool part 9 is guided in a slidably displaceable manner in a ring part 10 of the second mold half 3, thus for example as a result of a rail-like groove-spring guide 11, which is not illustrated in more detail, preferably in the manner of a dovetail guide, which, based on the sectional illustration according to FIG. 3, is placed at the same acute angle to the displacement axis x at which the outer surface 36 of the sliding jaw tool part 9 runs. In the illustrations, the spring is formed on the tool part 9, which can be slidably displaced in a groove of the second mold half 3 or in the ring part 10, respectively. As a result of this guide 11, a radial movement, which is directed perpendicular to the displacement axis x, of the sliding jaw tool parts 9 is generated simultaneously in response to a linear displacement of the sliding jaw tool parts 9 along the displacement axis x. Axial and radial displacement are therefore overlapped.

Both sliding end positions of the sliding jaw tool parts 9 are preferably stop-limited.

By using the sliding jaw tool parts 9, at least one undercut region 12 is made possible in the cavity 7.

As can be seen, for example, in FIG. 3, several undercut regions 12 can thereby also result, with optionally different undercut angles.

The sliding jaw tool parts 9 can be actively moved in the second mold half 3 in the ejection direction r into a position releasing the closure cap 5 (see FIG. 5).

In the mold half closed position according to FIG. 3, the sliding jaw tool parts 9 can furthermore support themselves on the facing surface of a tool receiving part 13 by means of the surface, which faces away from the first mold half 2 and which is therefore directed downwards in the illustrations. A full-surface support of the sliding jaw tool parts 9 on the tool receiving part 13 can result, and as preferred.

Via the ring part 10, the second mold half 3 is or the displaceable sliding jaw tools 9 are, respectively, fastened to the tool receiving part 13. In the case of an exemplary square outline—as illustrated—the ring part 10 has, for this purpose, passage bores 22 in the corner regions for the pass-through of holding elements 23. The latter cooperate in a holding manner with openings 24 in the tool receiving part 13.

According to FIG. 8, these holding elements 23 can be screws 25. The openings 24 are threaded bores in this case.

Figure 9:
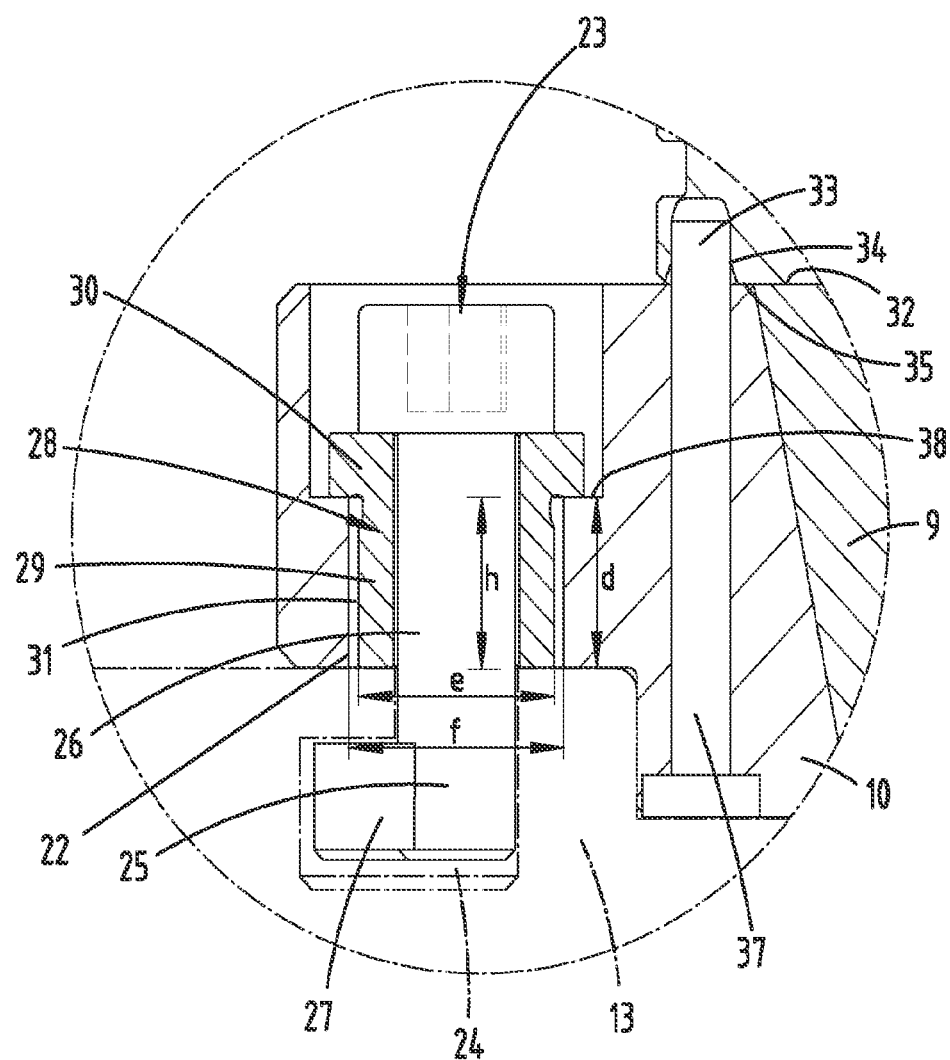
FIG. 9 an illustration corresponding to FIG. 8, relating to an alternative design.
Figure 10:
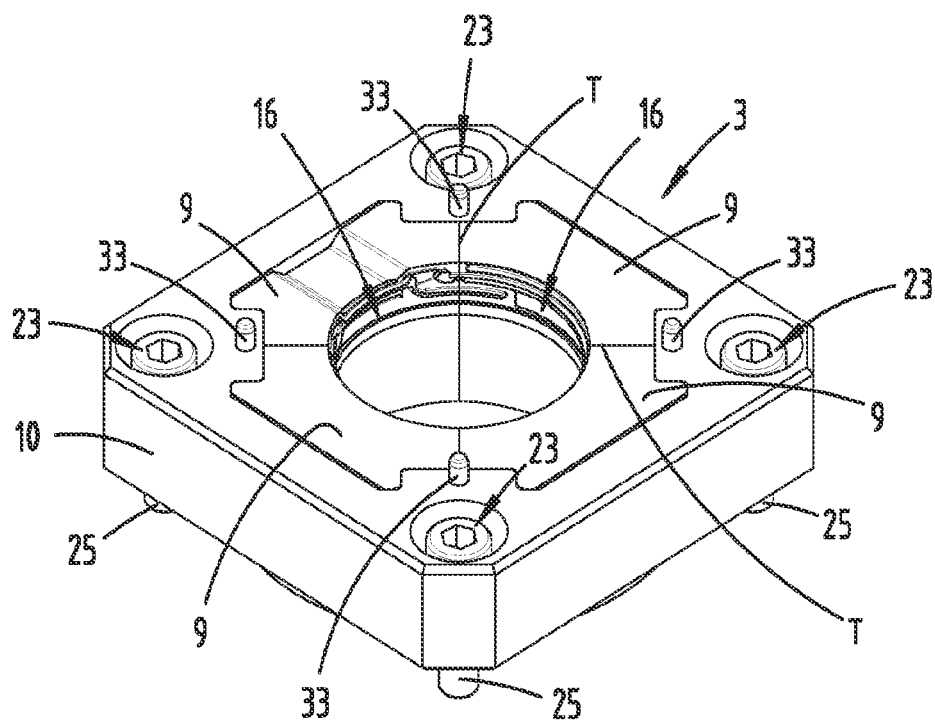
FIG. 10 a perspective top view onto the second mold half of the injection tool according to FIG. 1 with sliding jaw tool parts.
Figure 11:
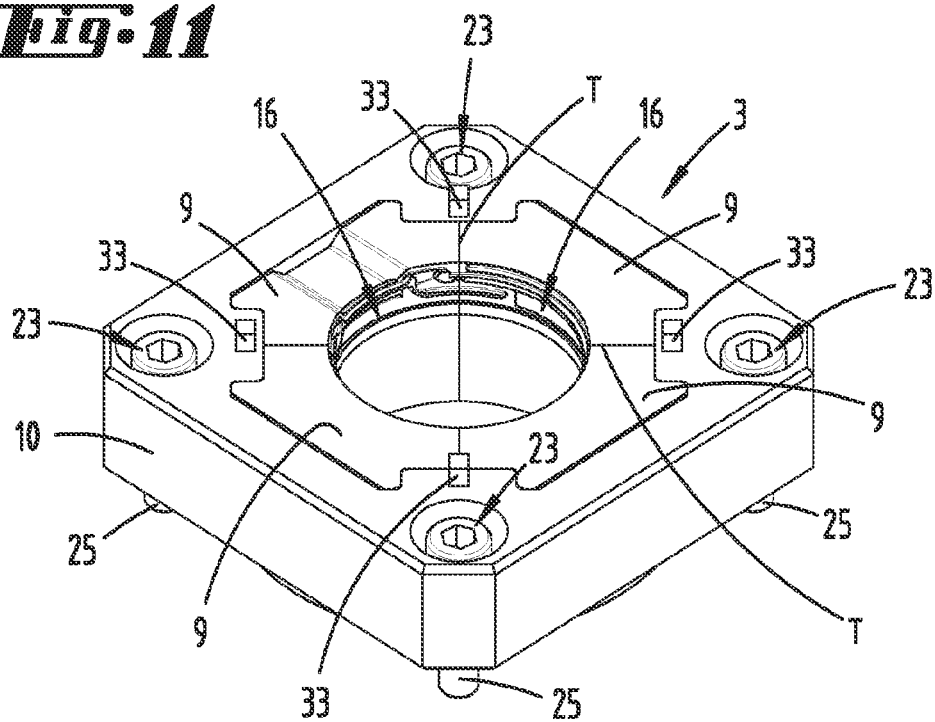
FIGS. 11 to 15 illustrations corresponding to FIG. 10, but relating to alternative embodiments.

In the alternative, the holding elements 23 can act, for example, in the manner of a quick release, further for example having a bolt 26 and a protrusion 27, which is directed from the bolt 26 essentially transversely thereto and which protrudes radially outwards in a wing-like manner and which can be brought into a locking active position by rotating the holding element 23, for example by 90 degrees or more (see FIG. 9). The opening 13 in the tool receiving part 13 can be formed in a key hole-like manner to the plug receptacle of the free end of the holding element 23.

The holding elements 23 can in each case pass with a bolt-like section through a sleeve 28, which is arranged in the passage bore 22 of the ring part 10. The sleeve 28 can thereby have a sleeve cylinder 29 and a sleeve collar 30, which protrudes radially to the outside on the upper end, by means of which the sleeve 28 engages over the edge 38 of the passage bore 22.

The sleeve cylinder 29 thereby preferably has a height h, viewed in the axial direction, which is further preferably dimensioned so as to be larger by a few hundredth to a few tenth millimeters, for example 0.01 to 0.05, optionally 0.1 to 0.2 millimeters, than the thickness d, measured in the same direction, of the ring part 10 in the region of the passage bore 22.

The outer diameter e of the sleeve cylinder 29 is dimensioned to be smaller than the free inner diameter f of the passage bore 22 The diameter e of the sleeve 28 can thus correspond approximately to 0.6- to 0.95-times the inner diameter f, so that a ring-like free space 31 results, which allows for a movement of the ring part 10 in a direction transversely to the ejection direction r of a few tenth millimeters, for example 0.1 to 0.5 mm, further for example 1 to 3 millimeters, optionally up to for example 2 to 5 millimeters.

The sleeve 28, which is fixed to the tool receiving part 13 via the holding element 23, allows for the stop-limited movability of the ring part 10 in a direction perpendicular to the displacement axis x.

The two mold halves 2 and 3 can furthermore have a positive connection formation for centering them relative to one another in the course of bringing together the mold halves.

In the ejection direction r, the second mold half 3 can thus have protrusions 33, which protrude beyond the separating surface 32, which defines the separating crack between the mold halves, for the positive cooperation with recesses 34, which are adapted to the protrusions 33, in the facing separating surface 35 of the first mold half 2.

FIGS. 1 to 10 show an embodiment with cone-like protrusions 33, which have an essentially circular outline perpendicular to the ejection direction r. The protrusions 33 are arranged in the corner regions of the ring part 10 between the sliding jaw tool parts 9 (see FIG. 10) and can be formed by means of free ends protruding freely over the separating surface 32 of pins 37, which essentially pass through the ring part 10 in the ejection direction r (see FIGS. 3, 5, and 8).

FIGS. 11 and 13 to 15 show further different formations with protrusions 33, which can have an essentially rectangular outline (square, elongated rectangular, optionally with circular arc-shaped flanks of the protrusion).

Figure 12:
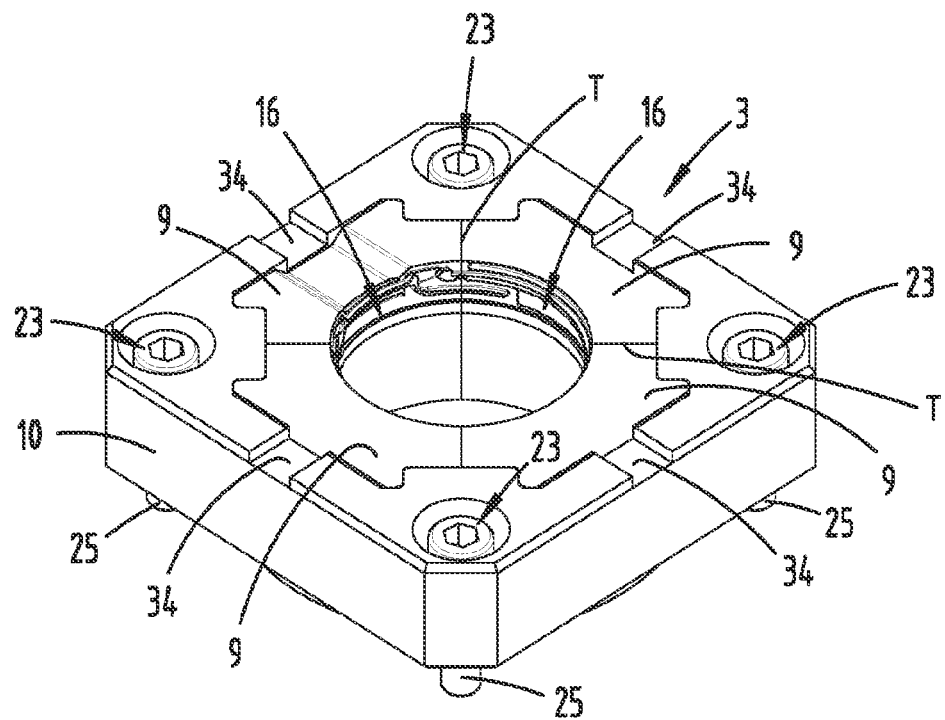
Figure 13:
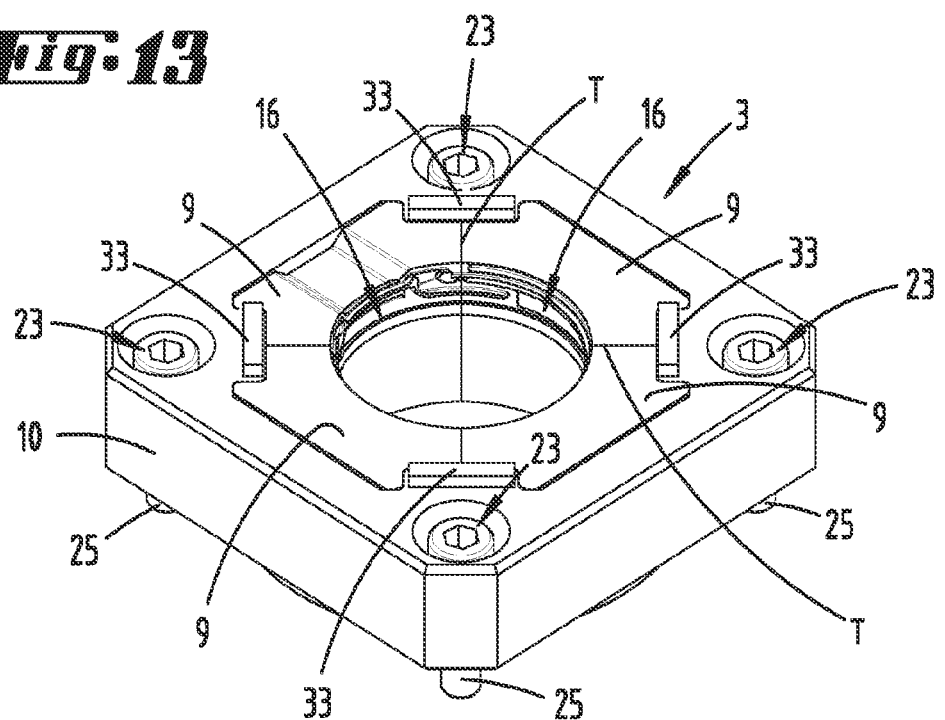
Figure 14:
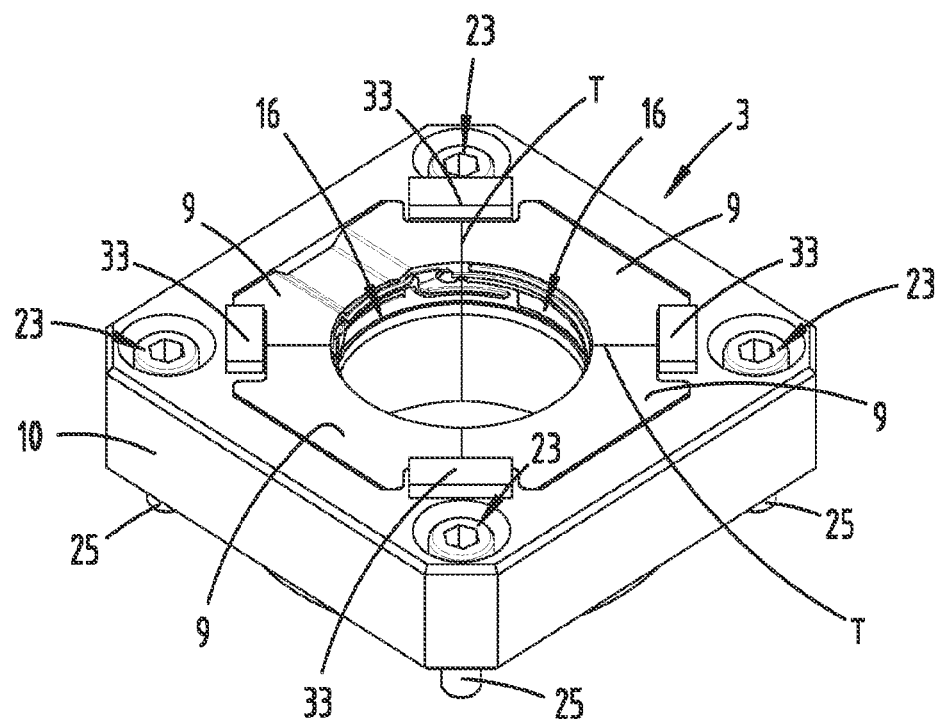
Figure 15:
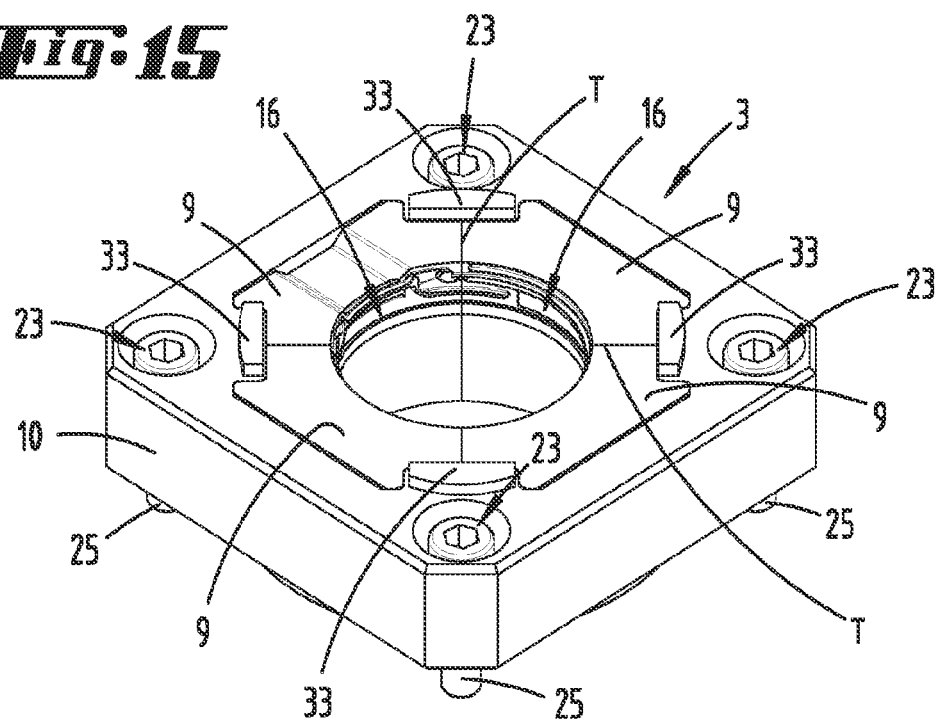

FIG. 12 shows an alternative, in which the recesses 34 in the separating surface 32 of the second mold half 3 are formed approximately assigned to the groove-spring guide 11 of the sliding jaw tool parts 9. These recesses 34 can thus be formed in a groove-like manner and so as to be open on the edge both radially on the inside as well as radially on the outside, for cooperation with correspondingly adapted protrusions in the region of the separating surface 35 of the first mold half 2.

As a result of the above-described positive connection between the mold halves 2 and 3, which can be attained in the course of each bringing together of the mold halves 2 and 3, an exact alignment thereof to one another is attained in response to each injection process, which is further supported by means of the remaining floating support of the second mold half 3 or of the ring part 10, respectively.

List of Reference Numerals

| | | | |
|---|---|---|---|
| 1 | plastic injection tool | 29 | sleeve cylinder |
| 2 | first mold half | 30 | sleeve collar |
| 3 | second mold half | 31 | free space |
| 4 | injection nozzle | 32 | separating surface |
| 5 | closure cap | 33 | protrusion |
| 6 | plastic mass | 34 | recess |
| 7 | cavity | 35 | separating surface |
| 8 | tool core | 36 | outer surface |
| 9 | sliding jaw tool part | 37 | pin |
| 10 | ring part | 38 | edge |
| 11 | groove-spring guide | 39 | separating region |
| 12 | undercut region | 40 | contour section |
| 13 | tool receiving part | 41 | retaining band |
| 14 | cap body | 42 | retaining ring |
| 15 | cap cover | 43 | unscrewing thread |
| 16 | partial injection contour | 44 | thread |
| 17 | tamper indicating band | 45 | mold section |
| 18 | web | 46 | edge |
| 19 | joint formation | 47 | section |
| 20 | separate structure | 48 | ejector |
| 21 | separating plane | 49 | contact region |
| 22 | passage bore | 50 | contact surface |
| 23 | holding element | 51 | contact region |
| 24 | opening | | |
| 25 | screw | | |
| 26 | bolt | a | arrow |
| 27 | protrusion | b | arrow |
| 28 | sleeve | d | thickness |
| e | diameter | | |
| f | diameter | | |
| h | height | | |
| r | ejection direction | | |
| x | displacement axis | | |
| y | cap longitudinal axis | | |
| T | separating plane | | |
| α | circumferential angle | | |

The invention claimed is:

1. A plastic injection tool (1) for producing a closure cap (5) with a cap body (14) and a cap cover (15) formed integrally with and of the same material as the cap body (14), wherein the injection tool (1) is divided into first and second mold halves (2, 3), which are configured to be displaced relative to one another, and wherein an injection nozzle (4) is formed in the first mold half (2), wherein sliding jaw tool parts (9), which are configured to simultaneously be moved in an ejection direction (r) of the produced closure cap (5) and perpendicular to the ejection direction (r), are further formed in the second mold half (3) radially outside to a central tool core (8), and a partial injection contour (16) of the cap body (14) is in each case formed in the sliding jaw tool parts (9), wherein the partial injection contours (16), combined in a circumferential direction of the closure cap (5) result in a complete injection contour of the part of the cap body (14), which is formed by the sliding jaw tool parts (9), wherein an ejector (48) is further provided to the second mold half (3), for ejecting the produced closure cap (5), wherein two or more of the sliding jaw tool parts (9) have partial injection contours (16) that differ from one another, wherein one of the sliding jaw tool parts (9) is in contact with the tool core (8) in the ejection direction (r) prior to the ejection of the closure cap (5) on two regions (51) located one behind the other in the ejection direction (r), wherein the sliding jaw tool parts (9) extend in an axial direction over more than half of a height of the cap body (14) and wherein the sliding jaw tool parts (9) are wedge-shaped in cross-section, widening in a longitudinal direction toward the first mold half (2).

2. The plastic injection tool according to claim 1, wherein the partial injection contour (16) of a sliding jaw tool part forms a joint formation (19), which is connected to the cap body (14) as well as to the cap cover (15), and which is formed completely in one or more partial injection contours (16).

3. The plastic injection tool according to claim 1, wherein the plastic injection tool is configured for forming the closure cap (5) with a tamper indicating band (17) and wherein an injection contour for the tamper indicating band (17) is formed completely in the complete injection contour of the cap body (14).

4. The plastic injection tool according to claim 1, wherein, the two regions (51) engage over two of the sliding jaw tool parts (9), and comprise two continuous contact regions (51) of the sliding jaw tool parts (9), which are located one on top of the other and which extend over a circumferential angle ($\alpha$) of 20 degrees or more, and which form a band (41) of the closure cap (5) between one another, which is connected to the cap body (14) on the one end and to the cap cover (15) on the other end.

5. The plastic injection tool according to claim 1, wherein the ejector (48) is axially covered by the sliding jaw tool parts (9) with regard to the closure cap (5) prior to the ejection.

6. The plastic injection tool according to claim 1, wherein the tool core (8) displaces into a forward position at the beginning of an ejection process by means of the sliding jaw tool parts (9) and the closure cap (5).

7. The plastic injection tool according to claim 1, wherein the second mold half (3) has a ring part (10), having an approximately square outline, in which the sliding jaw tool parts (9) are received so as to be movable on an inner side.

8. The plastic injection tool according to claim 7, wherein the ring part (10) is fastened to a tool receiving part (13).

9. The plastic injection tool according to claim 8, wherein the ring part (10) is movably fastened to the tool receiving part (13) in a plane perpendicular to the ejection direction (r).

10. The plastic injection tool according to claim 1, wherein the mold halves (2, 3) have one or more protrusions (33) and recesses (34), which effect an alignment relative to one another in the course of bringing together the mold halves (2, 3).

11. A plastic injection tool (1) for producing a closure cap (5) with a cap body (14) and a cap cover (15) formed integrally with and of the same material as the cap body (14), wherein the injection tool (1) is divided into first and second mold halves (2, 3), which are configured to be displaced relative to one another, and wherein an injection nozzle (4) is formed in the first mold half (2), wherein sliding jaw tool parts (9), which are configured to simultaneously be moved in an ejection direction (r) of the produced closure cap (5) and perpendicular to the ejection direction (r), are further formed in the second mold half (3) radially outside to a central tool core (8), and a partial injection contour (16) of the cap body (14) is in each case formed in the sliding jaw tool parts (9), wherein the partial injection contours (16), combined in a circumferential direction of the closure cap (5) result in a complete injection contour of the part of the cap body (14), which is formed by the sliding jaw tool parts (9), wherein an ejector (48) is further provided to the second mold half (3), for ejecting the produced closure cap (5), wherein two or more of the sliding jaw tool parts (9) have partial injection contours (16) that differ from one another, wherein one of the sliding jaw tool parts (9) is in contact with the tool core (8) in the ejection direction (r) prior to the ejection of the closure cap (5) on two continuous contact regions (51) located one behind the other in the ejection direction (r), wherein the second mold half (3) has a ring part (10), having an approximately square outline, in which the sliding jaw tool parts (9) are received so as to be movable on an inner side, wherein the ring part (10) is movably fastened to a tool receiving part (13) in a plane perpendicular to the ejection direction (r), wherein a holding element (23) for the ring part (10) is provided, which is fastened to the tool receiving part (13) by interconnecting a sleeve (28), and wherein a passage bore (22) of the ring part (10), through which the holding element (23) extends with the sleeve (28), leaves a free space (31) to the sleeve (28).

12. The plastic injection tool according to claim 11, wherein the holding element (23) is formed as screw (25).

13. The plastic injection tool according to claim 11, wherein the holding element (23) is formed as bolt (26) with a protrusion (27), which is made effective by rotating.

14. A method for producing a closure cap (5) in a plastic injection tool (1), wherein the closure cap (5) has a cap body (14) and a cap cover (15) formed integrally with and of the same material as the cap body (14), wherein the injection tool (1) is divided into first and second mold halves (2, 3), which can be displaced relative to one another, and wherein an injection nozzle (4) is formed in the first mold half (2) and sliding jaw tool parts (9) are formed in the second mold half (3), wherein at least two of the sliding jaw tool parts (9) are formed identically or at least approximately identically with respect to a partial injection contour, while at least one of the sliding jaw tool parts (9) has a partial injection contour, which differs from a partial injection contour of further sliding jaw tool parts (9), wherein the sliding jaw tool parts (9) extend in an axial direction over more than half of a height of the cap body (14) and wherein the sliding jaw tool parts (9) are wedge-shaped in cross-section, widening in a longitudinal direction toward the first mold half (2), wherein the method comprises in a first step forming the cap body (14) in the injection tool (1) in a same injection process with a design, which differs over the circumference, in the sliding jaw tool parts (9), and the cap cover (15) is formed in the first mold half (2), and in the same step, one of the sliding jaw tool parts (9) is brought into contact with the tool core (8) in the ejection direction (r) prior to the ejection of the closure cap (5) on two regions (51) located one behind the other and spaced apart from one another in the ejection direction (r), which appear jointly in a cross section through the second mold half, in which cross section a cap longitudinal axis runs linearly.

* * * * *